(12) United States Patent
Gunnalan et al.

(10) Patent No.: US 12,519,850 B2
(45) Date of Patent: Jan. 6, 2026

(54) PEER-TO-PEER ULTRA-LOW LATENCY STREAMING OF REAL-TIME MEDIA

(71) Applicant: Microsoft Technology Licensing, LLC, Redmond, WA (US)

(72) Inventors: Rajesh Gunnalan, Sammamish, WA (US); Mihhail Konovalov, Kirkland, WA (US); Andrei Kargalov, Bellevue, WA (US); Dharmendra Thotakura, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 18/591,429

(22) Filed: Feb. 29, 2024

(65) Prior Publication Data

US 2025/0280052 A1    Sep. 4, 2025

(51) Int. Cl.
*H04L 67/1074* (2022.01)
(52) U.S. Cl.
CPC ................. *H04L 67/108* (2013.01)
(58) Field of Classification Search
CPC ..................................... H04L 67/108
See application file for complete search history.

(56) References Cited

U.S. PATENT DOCUMENTS

| | | | |
|---|---|---|---|
| 9,338,209 B1 | 5/2016 | Begen et al. | |
| 9,344,725 B2 | 5/2016 | Demas et al. | |
| 9,532,062 B2 | 12/2016 | De Cicco et al. | |
| 10,147,436 B2 | 12/2018 | Riedmiller et al. | |
| 10,893,303 B1 * | 1/2021 | Mitaru | H04N 21/2353 |
| 11,025,930 B2 | 6/2021 | Tsukagoshi | |
| 11,217,260 B2 | 1/2022 | Neuendorf et al. | |
| 11,706,497 B1 * | 7/2023 | Gunnalan | H04N 21/64792 725/14 |
| 11,736,552 B1 * | 8/2023 | Gunnalan | H04L 65/762 709/231 |
| 2007/0276954 A1 | 11/2007 | Chan et al. | |
| 2009/0228946 A1 | 9/2009 | Perlman | |
| 2010/0172278 A1 | 7/2010 | Nishio et al. | |
| 2010/0172286 A1 | 7/2010 | Yoshii et al. | |

(Continued)

FOREIGN PATENT DOCUMENTS

KR    20210018870    2/2022

OTHER PUBLICATIONS

International Search Report and Written Opinion received for PCT Application No. PCT/US2025/011288, Mar. 24, 2025, 14 pages.

(Continued)

*Primary Examiner* — Minh Chau Nguyen
(74) *Attorney, Agent, or Firm* — Klarquist Sparkman, LLP

(57) ABSTRACT

The present disclosure provides techniques and solutions for facilitating low-latency media streaming. Streaming techniques include sending or receiving blocks, where a block contains a sequence identifier for a media type and a single discrete sample of a particular media type. The block does not contain a sample of another media type. The sequence identifier can be used for purposes such as reducing the length of a run of blocks of a particular media type, reordering blocks, or duplicating duplicate blocks. The sequence identifiers also facilitate peer-to-peer streaming techniques, as they can assist in processing blocks that are received by a streaming client from multiple peers.

20 Claims, 24 Drawing Sheets

(56) References Cited

U.S. PATENT DOCUMENTS

| | | |
|---|---|---|
| 2011/0225315 A1 | 9/2011 | Wexler |
| 2012/0221740 A1 | 8/2012 | Arsenio |
| 2013/0246632 A1 | 9/2013 | Ginde |
| 2013/0262695 A1 | 10/2013 | Friedrichsen et al. |
| 2014/0281017 A1 | 9/2014 | Apte |
| 2015/0085190 A1 | 3/2015 | Iwami et al. |
| 2015/0195561 A1 | 7/2015 | Wang |
| 2016/0036673 A1 | 2/2016 | Meirosu et al. |
| 2016/0248834 A1 | 8/2016 | Richards et al. |
| 2016/0277769 A1* | 9/2016 | Sadhwani ............ H04N 19/127 |
| 2016/0350056 A1 | 12/2016 | Makar et al. |
| 2017/0041238 A1 | 2/2017 | Do et al. |
| 2017/0222936 A1 | 8/2017 | Al-roubaiey et al. |
| 2018/0084020 A1 | 3/2018 | Li et al. |
| 2019/0089760 A1 | 3/2019 | Zhang et al. |
| 2019/0200054 A1 | 6/2019 | Dharmaji |
| 2019/0253738 A1 | 8/2019 | Houze |
| 2021/0209807 A1 | 7/2021 | Oh |
| 2021/0258589 A1 | 8/2021 | Tsukagoshi |
| 2022/0006999 A1 | 1/2022 | Oh |
| 2022/0385492 A1* | 12/2022 | Linne ................. H04L 12/1822 |
| 2022/0394073 A1 | 12/2022 | Burke et al. |
| 2023/0117444 A1* | 4/2023 | Gunnalan ................ H04L 65/80 709/231 |
| 2023/0308729 A1 | 9/2023 | Gunnalan |

OTHER PUBLICATIONS

"Improve Encoding Efficiency and Video Quality with Adaptive LTR," Feb. 22, 2018, 8 pages.

Applicant Initiated Interview Summary Issued in U.S. Appl. No. 17/970,148, Oct. 31, 2022, 3 pages.

International Search Report and Written Opinion received for PCT Application No. PCT/US2022/050815, May 12, 2023, 21 pages.

Invitation to Pay Additional Fees received for PCT Application No. PCT/US2022/050815, mailed on Jun. 2, 2023, 13 pages.

Non-Final Office Action Issued in U.S. Appl. No. 17/670,148, Mailed Date: Sep. 29, 2022, 13 Pages.

Non-Final Office Action mailed on Jan. 3, 2024, in U.S. Appl. No. 18/205,064, 7 pages.

Non-Final Office Action received in U.S. Appl. No. 17/949,869, dated Feb. 16, 2023, 15 pages.

Notice of Allowance mailed on Apr. 24, 2024, in U.S. Appl. No. 18/205,064, 7 pages.

Notice of Allowance mailed on Jun. 12, 2023, in U.S. Appl. No. 17/670,148, 4 pages.

Notice of Allowance mailed on Mar. 2, 2023, in U.S. Appl. No. 17/670,148, 8 pages.

Reference Frame (video), Wikipedia, May 23, 2021, 2 pages.

Scalable Video Coding, Wikipedia, Jul. 4, 2021, 5 pages.

Van der Stok et al., "Hierarchical resource allocation for robust in-home video streaming," Journal of Systems & Software, vol. 80, No. 7, pp. 951-961 (May 2007).

Non-Final Office Action received in U.S. Appl. No. 17/505,326, filed Oct. 27, 2022, 19 pages.

Iyengar et al., "QUIC Loss Detection and Congestion Control," Oct. 20, 2020.

International Search Report received in PCT/US2022/039359, Nov. 18, 2022, 11 pages.

\* cited by examiner

| Position | Property | Description |
|---|---|---|
| 1 | Track ID 1204a | Media stream ID, used to multiplex streams |
| 2 | Timestamp 1204b | Presentation time, common time for track synchronization during playback |
| 3 | Key ID 1204c | Reference to encryption key |
| 4 | IV Seed 1204d | Used to restore initialization vector for encrypted sample |

FIG. 12

| Position | Content | Datatype | Description |
|---|---|---|---|
| 1 | Block Size 1308a | VInt | Total block size, useable for stream based delivery (such as TCP), can be omitted for message-based delivery |
| 2 | Object Type 1308b | Byte | Useable to indicate object/media/sample type |
| 3 | Payload Size Override 1308c | VInt+VInt | Provides indicator of random bytes added for padding purposes, such as to satisfy encryption block size |
| 4 | Recovery Index 1308d | VInt+VInt | Media sequence number, monotonically increasing and used for sample ordering |
| 5 | Wall Clock 1308e | VInt+VInt | Unix time in milliseconds at time of sample ingestion, for calculating media delivery latency |
| 6 | Media 1308f | VInt + Bytes | VInt for TrackID, Timestamp, KeyID, and IV Seed followed by payload bits to end of block |

FIG. 13

PEER-TO-PEER ULTRA-LOW LATENCY STREAMING OF REAL-TIME MEDIA

BACKGROUND

Based on the interaction and engagement need, online meetings can be broadly divided into interactive meetings (e.g., called fast lane meetings) and passive meetings (e.g., called slow lane meetings). Interactive meetings are the typical online meetings where participants can freely contribute to the media session (e.g., chatting, screen sharing, etc.). Passive meetings effectively perform content delivery to the meeting participants with no option for the participants to interact or contribute media content to the online meeting. Passive meetings typically leverage streaming technologies and traditional content delivery networks (CDNs) to deliver the streaming media.

Passive meetings can scale to handle global scale media delivery. However, passive meetings experience significant latency. For example, latencies for passive meetings (e.g., introduced by CDNs and/or buffering) can be about 30 seconds. The inherent latency associated with passive meetings precludes any kind of meaningful interaction or engagement with the presenters or other meeting participants.

Interactive meetings support interaction between the meeting participants due to their low latency, but they are difficult to scale to a large number of users, and even scaling to a moderate number of users can add significant complexity (e.g., in terms of computer and network hardware, bandwidth, etc.). For example, interactive meetings may be suited to up to about 1,000 users. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the present disclosure provides a process of performing processing operations at a streaming client with respect to blocks comprising media samples to facilitate low-latency media streaming by reducing consecutive runs of a particular media sample type. A first data block is received. The first data block includes a first sequence identifier number for a first media type and a first single discrete media sample of the first media type. The first data block does not include a media sample of a media type other than the first media type.

A plurality of data blocks are received that includes respective single discrete media samples of the first media type. The single discrete media samples of the first media type are ordered in a stream. A second data block is received. The second data block includes a second sequence identification number for a second media type and a first single discrete sample of the second media type. The second data block does not include a media sample of a media type other than the second media type. The second media type is a media type other than the first media type.

It is determined that a consecutive number of discrete media samples of the first media type satisfies a threshold. Based on determining that a consecutive number of discrete media samples of the first media type satisfies a threshold, the first discrete sample of the second media type is inserted between consecutive media samples of the first media type in the stream. The first single discrete media sample of the first media type and the second discrete media sample of the second media type are provided to a media player to be rendered at the streaming client. The streaming client receives data blocks for a stream comprising the plurality of data blocks from multiple sources.

In another aspect, the present disclosure provides a process of performing streaming operations at a streaming client with respect to blocks comprising media samples to facilitate low-latency media streaming by reordering media samples of a type. A first data block is received at a first time. The first data block includes a first sequence identifier number for a first media type and a first single discrete media sample of the first media type. The first data block does not include a media sample of a media type other than the first media type.

A second data block is received at a second time. The second time is after the first time. The second data block includes a second sequence identification number for the first media type and a second single discrete sample of the first media type. The second data block does not include a media sample of a media type other than the first media type.

It is determined that the second sequence identifier is lower than the first sequence identifier. The first single discrete media sample of the first media type and the second single discrete media sample of the first media type are reordered so that the second single discrete media sample of the first media type is provided in a stream to the media player before the first single discrete media of the first media type. The first single discrete media sample of the first media type and the second discrete media sample of the first media type are provided to a media player to be rendered at the streaming client. The streaming client receives data blocks for a stream comprising a plurality of data blocks from multiple sources.

In a yet further aspect, the present disclosure provides a process of performing processing operations at a streaming client with respect to blocks comprising media samples to facilitate low-latency media streaming by dropping duplicate blocks. A first data block is received at a first time. The first data block includes a first sequence identifier number for a first media type and a first single discrete media sample of the first media type. The first data block does not include a media sample of a media type other than the first media type.

A second data block is received at a second time. The second time is after the first time. The second data block includes a second sequence identification number for the first media type and a second single discrete media sample of the second media type. The second data block does not include a media sample of a media type other than the first media type. It is determined that the second sequence identifier is the same as the first sequence identifier. The second data block is discarded and the second single discrete media sample of the first media type is not provided to be rendered at a client device. The first single discrete media sample of the first media type is provided to a media player to be rendered at the streaming client. The streaming client receives data blocks for a stream comprising a plurality of data blocks from multiple sources.

In another aspect, the present disclosure provides a process of performing operations as a streaming client in peer-to-peer delivery of streaming media content with low latency. A first data block is sent to a first receiving computing system. The first data block includes a first sequence identifier number for a first media type and a first single discrete media sample of the first media type. The first data block does not include a media sample of a media type other than the first media type.

A second data block is sent to a second receiving computing system. The second data block includes a second sequence identification number for a second media type and a first single discrete sample of the second media type. The second data block does not include a media sample of a media type other than the second media type. The second media type is the first media type or is a media type other than the first media type. The second receiving computing system is the first receiving computing system or is a computing system other than the first receiving computing system.

The first single discrete media sample of the first media type and the second single discrete media sample of the second media type are rendered. The first sequence identifier number and the second sequence identifier number are used in ordering media samples for rendering at a first streaming client. The streaming client receives data blocks for a stream comprising a plurality of data blocks from multiple sources.

The present disclosure also provides a process of operations in streaming media content with low latency. A first data block is received. The first data block includes a first sequence identifier number for a first media type and a first single discrete media sample of the first media type. The first data block does not include a media sample of a media type other than the first media type.

A second data block is received. The second data block includes a second sequence identification number for a second media type and a first single discrete sample of the second media type. The second data block does not include a media sample of a media type other than the second media type. The second media type is the first media type or is a media type other than the first media type. The first single discrete media sample of the first media type and the second discrete media sample of the second media type are provided to a media player to be rendered at a client device. The client device receives data blocks for a stream comprising the first data block and the second data block from multiple sources.

In another aspect, the present disclosure provides operations in delivering of streaming media content with low latency. A first data block is sent to a first receiving computing system. The first data block includes a first sequence identifier number for a first media type and a first single discrete media sample of the first media type. The first data block does not include a media sample of a media type other than the first media type.

A second data block is sent to a second receiving computing system. The second data block includes a second sequence identification number for a second media type and a first single discrete sample of the second media type. The second data block does not include a media sample of a media type other than the second media type and the second media type is the first media type or is a media type other than the first media type. The second receiving computing system is the first receiving computing system or is a computing system other than the first receiving computing system. The first sequence identifier number and the second sequence identifier number are used in ordering media samples for rendering at a first streaming client. The first streaming client receives data blocks from a stream comprising the first data block and the second data block from multiple sources.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 12 provides a table of properties that can be provided for media sample blocks having the block format of FIG. 11.

FIG. 13 provides another table of properties that can included for media sample blocks having the example block format of FIG. 11.

DETAILED DESCRIPTION

Example 1—Overview

Figure 1:
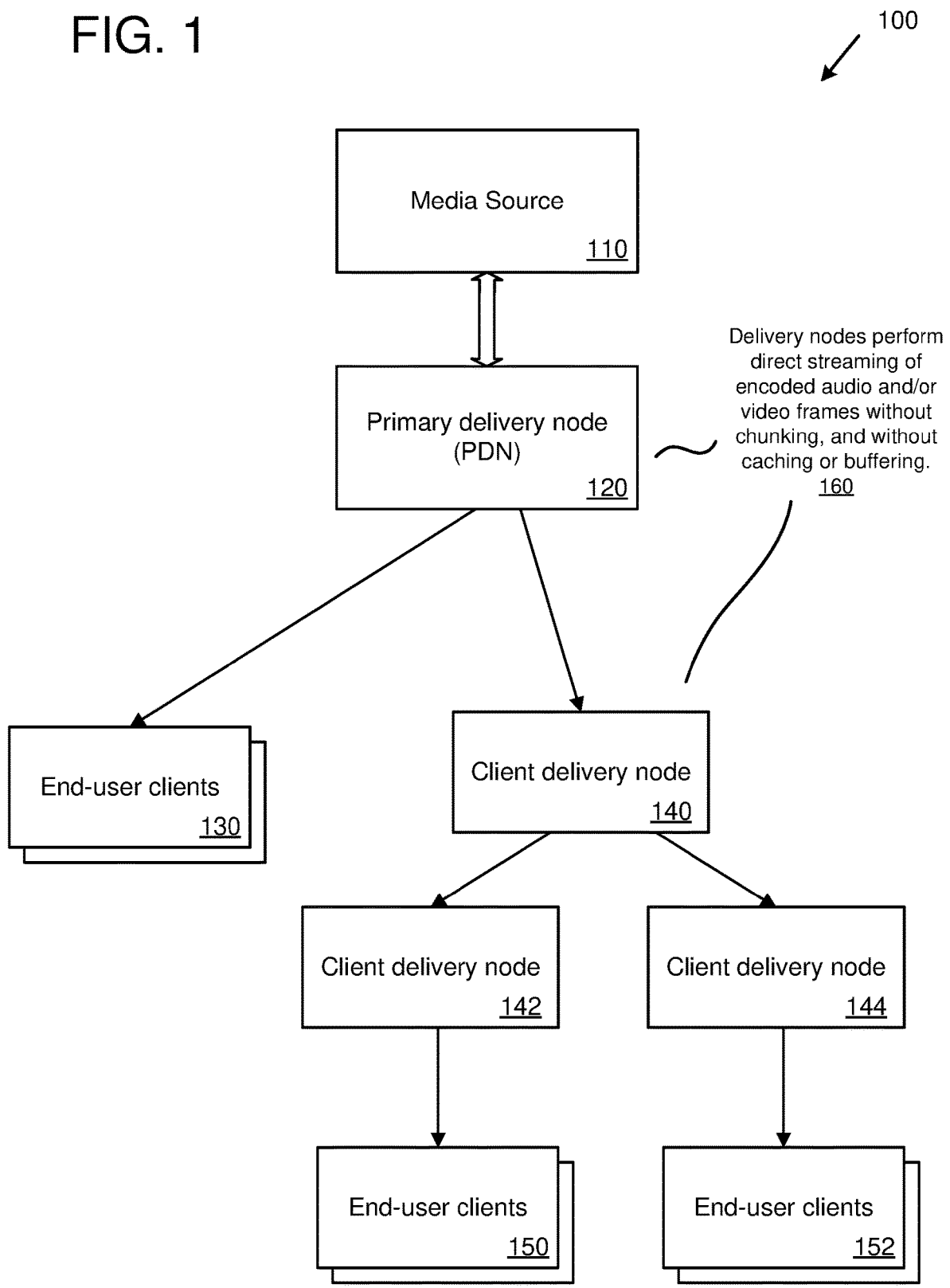
FIG. 1) is a block diagram depicting an example environment for low-latency real-time streaming of media content.

The following description is directed to technologies for low-latency real-time streaming of media content. For example, streaming media content can be received from a media source, where the streaming media content includes audio and/or video content. An audio/video stream can be streamed to one or more streaming clients. The audio/video stream is streamed as a sequence of encoded audio and/or video frames, which are independent encoded audio and/or video frames that are not grouped into chunks for streaming. Furthermore, the sequence of encoded audio and/or video frames is streamed to the one or more streaming clients as a one-way stream and without receiving any requests from the one or more streaming clients for subsequent frames or chunks.

The technologies described herein can be used to efficiently (e.g., with low overhead) stream audio/video content to streaming clients with low latency. The technologies described herein provide various advantages over existing streaming solutions (e.g., existing content delivery network (CDN) solutions), including existing streaming solutions that organize streaming content into chunks for streaming (also referred to as file-based streaming or segment-based streaming). With existing solutions that organize streaming content into chunks, the client receives a manifest send requests for a next chunk of streaming content on a periodic basis ((e.g., the client would periodically request the next chunk, such as the next 2-second chunk, of video and/or audio data). In addition, such existing solutions cache (e.g., buffer) the chunks at various locations within the network (e.g., at various content delivery nodes). As a result, such existing solutions have high latency and high overhead.

The technologies described herein reduce the overhead of receiving video and/or audio samples because the streaming client does not have to request audio and/or video samples from the computing device (e.g., server) sending the audio and/or video samples. In other words, during streaming the client does not send any requests to the server (i.e., the client merely receives the streamed audio and/or video frames without any requests or polling). By not sending any request or performing any polling operations during streaming, the technologies described herein provide reduced overhead (e.g., reduce computing resource utilization, such as processor, network bandwidth, and memory utilization) and reduced latency (e.g., the client does not spend time sending a request for a next chunk and waiting for the response). This is in contrast to existing solutions, such as existing content delivery network solutions, in which the client requests (e.g., as a polling operation) each next chunk of streaming media content.

Technologies described herein implement efficient forking of audio/video streams. Forking is performed using techniques that result in lower overhead, lower latency, and reduced computing resource utilization. For example, forking can be accomplished by sending audio and/or video frames to one or more additional streaming clients and without having to modify header information of every frame (e.g., the frames can be sent to the additional streaming clients as they are received without any modification or other processing). The forking can be performed with minimal setup (e.g., sending a manifest from which the client or delivery node selects the stream or streams to receive). Once the minimal setup is performed, the streaming can begin and continue without any additional requests from the client or delivery node.

The present disclosure also describes that a plurality of streaming clients can be monitored to determine whether any of them have fallen behind in streaming the media stream. When a streaming client falls behind, a portion of video data to be streamed to the streaming client can be selectively dropped based on scalability information and/or long-term reference (LTR) frame information. The low-latency streaming can be performed without using per-client quality feedback from the plurality of streaming clients. When streaming using a semi-lossy protocol, a plurality of delivery modes can be used, where each delivery mode is for a different type of encoded video data and provides a different level of reliability.

The present disclosure further provides a particular block format that can facilitate low-latency streaming. In one aspect, the block format includes a sequence number that identifies a position of a media sample in the block within a stream for a particular media type. The sequence number can be used for ordering blocks within the stream for the media type, or determining whether duplicate blocks have been received or whether blocks are missing. The sequence number can provide for a faster way of managing packets compared with, for example, using timestamps associated with media samples included within the blocks. The sequence numbers can be useful when differing network delays might be encountered, such that blocks may be received out of order.

The sequence numbers also facilitate distribution topologies where a streaming client may receive blocks, including blocks having the same media type, from multiple sources. As a specific example, disclosed techniques facilitate the use of peer-to-peer networks for block delivery. If the same block is received from multiple clients, this can be quickly determined using the sequence numbers. Similarly, if blocks are received out of order, the sequence number can be used to place the blocks in the correct sequence.

Blocks can be of different types, including having blocks for specific types of media samples or blocks that contain content other than media samples. A given block can have an identifier of a block type, which thus allows media samples to be placed in the correct media type stream, and where the sequence numbers allow for ordering of samples within a given media stream.

Block types that do not include media samples can include block types that initialize "tracks" for a particular media stream, such as information useable for codecs of a media player where, as described above, after the track is initialized at a streaming client, subsequent media blocks do not need to include such information.

Another block type can be used for key management, including for key rotation. For example, a block type can include a mapping of a GUID for an encryption key to a local key ID. Another block type can be used for arbitrary system messages, such as to indicate when a stream may restart, such as because of resolution changes, or when a stream is scheduled to end.

Disclosed block formats can be used to send data for use in other streaming protocols, such as HLS or DASH. Accordingly, block types can include a block type that include file data, as well as a block type that can be used to delete files, such as for cache management.

As discussed, aspects of the block format can be useful in implementing peer-to-peer block distribution. The sequence numbers allow samples received from multiple sources to be quickly analyzed, so that samples can be placed in the correct media sample stream, in the correct order, and duplicate samples rejected. At a streaming client, these and other operations can be performed by an interleaver component. Other actions that can performed by the interleaver component include rearranging sample types in a stream so that large runs of consecutive samples of the same sample type are avoided, and taking action to identify, and potentially heal, gaps in samples for a stream of a particular media type.

Disclosed streaming techniques and block formats can have additional features that can provide for improved streaming. For example, blocks can "pack" media samples in a block, such as help provide blocks having media samples of a fixed size or desired size range. Assuming overhead associated with sending a block is relatively unchanged by the size of the media sample, a fixed duration of media (such as 100 milliseconds) or a fixed buffer size can be used to help "amortize" the cost of a network "send" operation.

Example 2—Terminology

The term "media source" refers to a source of streaming audio and/or video content. In some implementations, the streaming audio and/or video content is real-time streaming audio and/or video content. For example, the real-time streaming audio and/or video content can be from a real-time video conference or meeting (e.g., generated by compositing audio and/or video content from multiple participants into a composited audio and/or video stream). The media source can provide the streaming audio and/or video content in a variety of formats. For example, the streaming audio and/or video content can be provided as unencoded (e.g., raw) audio and/or video samples (e.g., generated by locally connected or remote audio and/or video capture devices). The streaming audio and/or video content can also be provided as encoded audio and/or video data (e.g., encoded according to corresponding audio and/or video coding standards).

The term "audio/video stream" refers to a stream containing a sequence of encoded audio and/or video frames (e.g., comprising corresponding audio and/or video samples). Disclosed techniques can provide media block types that include a single media sample of a single media type. These types of media samples in disclosed block format can be referred to as "discrete media samples." The encoded audio and/or video frames are encoded via a corresponding audio and/or video codec. A given audio/video stream is encoded with a specific pre-defined quality (e.g., a specific resolution, bitrate, etc.). The term "pre-defined quality" indicates that the quality is client-independent and not specific to any given streaming client. In other words, the streaming technology described herein can provide a number of pre-defined quality audio/video streams for the streaming client to select from.

The term "stream metadata" refers to information describing the audio/video streams that are available from a given delivery node for specific streaming media content. The information includes an indication of the pre-defined quality for each available audio/video stream (e.g., the resolution, bitrate, etc.). For example, there could be three available audio/video streams with differing pre-defined qualities for streaming identified streaming media content. The stream metadata could identify the three available audio/video streams with labels such as "high" quality, "medium" quality, and "low quality. The stream metadata could also provide more specific information describing the three available audio/video streams (e.g., indicating that a first audio/video stream has 720p video quality, that a second audio/video stream has 1080p video quality, and so on). The stream metadata could also identify the specific audio and/or video codec used for a given audio/video stream (e.g., indicating that a first audio/video stream contains AAC encoded audio data and H.264 encoded video data).

The term "delivery node" refers to software and/or hardware that is configured (e.g., via software instructions) to perform low-latency real-time streaming of audio/video streams. A delivery node could be a primary delivery node or a client delivery node. A primary delivery node typically operates in a cloud environment (e.g., implemented via cloud computing services) and distributes audio/video streams to end-user clients as well as to client delivery nodes. A client delivery node typically operates in a network, such as a network of an organization, and distributes audio/video streams to end-user clients as well as to other client delivery nodes (e.g., within the organization).

Delivery nodes that are clients can be used in "peer-to-peer" block distribution. Peer-to-peer block distribution can include having a given client both sending and receiving blocks. Further, clients can receive blocks from, or provide blocks to, multiple other peer clients. Peer-to-peer implementations can include other features of peer-to-peer networks, including at least some aspects of peer discovery by clients, distribution of distributed hash tables, and maintenance of routing tables. Peer-to-peer network implementations can include at least certain functions that are performed by, or assisted using, a centralized component.

The term "streaming client" refers to a client that receives an audio/video stream. A streaming client can be an end-user client that is the destination for the audio/video stream. For example, an end-user client can be a software application running on a computing device (e.g., laptop or desktop computer, tablet, smart phone, or another type of computing device) that decodes and presents (e.g., via audio and/or video playback) the received audio/video stream. A streaming client can also be a client delivery node that further distributes the audio/video stream (e.g., to other end-user clients and/or to other client delivery nodes).

The term "media content" refers to encoded audio and/or video content. The encoded audio and/or video content contains a sequence of encoded audio and/or video frames (e.g., comprising corresponding audio and/or video samples). The encoded audio and/or video frames are encoded via a corresponding audio and/or video codec. By sending individual media samples, such a video frames, additional encoding can be avoided, at least in some implementations, and so samples can be directly provided to a media player, and rendered using the appropriate codec.

The term "streaming" refers to transmitting media content, as a media stream, from a first computing device to a second computing device via a computer network.

The term "lossless protocol" refers to one or more network protocols that provide for reliable transmission of data over a computer network from a first computing device (e.g., a server) to a second computing device (e.g., a client). When data fails to reach the destination computing device, the lossless protocol retransmits the data until it is successfully received (thus providing reliable transmission). Examples of lossless protocols include transmission control protocol (TCP), hypertext transfer protocol (HTTP), HTTP live streaming (HLS), and dynamic adaptive streaming over HTTP (DASH). In some implementations, a lossless transport protocols, such as TCP, is used to ensure reliable transmission of data to the client.

The term "semi-lossless protocol" refers to one or more network protocols that provide semi-reliable transmission of data over a computer network from a first computing device (e.g., a server) to a second computing device (e.g., a client). Semi-lossless protocols can provide different levels of reliability (e.g., different delivery modes).

Example 3—Example Environments for Low-Latency Real-Time Streaming of Media Content FIG. 1 is a diagram depicting example environment 100 for low-latency real-time streaming of media content. The example environment 100 includes a media source 110. The media source 110 is a source of streaming audio and/or video content (e.g., unencoded or encoded audio and/or video content).

The example environment 100 includes a primary delivery node (PDN) 120. The primary delivery node 120 receives streaming audio and/or video content from the media source 110. For example, the primary delivery node 120 can receive the streaming audio and/or video content in the form of unencoded audio and/or video samples or in the form of encoded audio and/or video frames (e.g., at one or more quality levels). In some implementations, the primary delivery node 120 receives unencoded audio and/or video content from the media source 110, and performs audio and/or video encoding operations (e.g., using audio and/or video codecs) to generate encoded audio and/or video streams at one or more quality levels. In some implementations, the primary delivery node 120 receives the streaming audio and/or video content in an already encoded format (e.g., encoded at one or more quality levels), and can perform relay and/or transcoding operations. The primary delivery node 120 provides audio/video streams to client delivery nodes, including to client delivery node 140, and to end-user clients, including to end-user clients 130.

The example environment 100 includes client delivery nodes 140, 142, and 144. For example, client delivery nodes 140, 142, and 144 could be located within a network of an organization to serve clients that are local to the organization. The client delivery nodes 140, 142, and 144 deliver audio/video streams to other client delivery nodes and/or to end-user clients. As depicted, client delivery node 140 delivers audio/video streams to client delivery nodes 142 and 144. Client delivery node 142 delivers audio/video streams to end-user clients 150. Client delivery node 144 delivers audio/video streams to end-user clients 152.

Audio/video streaming is performed within the example environment 100 (by the primary delivery node 120 and the client delivery nodes 140, 142, and 144) by streaming a sequence of encoded audio and/or video frames as independent encoded audio and/or video frames and without grouping frames into chunks for delivery, as depicted at 160. In other words, the end-user clients (including end-user clients 130, 150, and 152) receive the audio/video streams without sending requests for a next chunk of streaming content (as would normally be done with a content delivery network). As a result, audio/video streaming is performed within the example environment 100 with low overhead and very low latency (e.g., no requests from the end-user clients for subsequent frames).

In addition, audio/video streaming within the streaming architecture depicted in the example environment 100 is performed by directly streaming the encoded audio and/or video frames (e.g., directly streaming from the primary delivery node 120 to the client delivery node 140, to the client delivery node 144, and ultimately to the end user clients 152). In at least some implementations, the direct streaming is performed without any caching or buffering by the delivery nodes, as depicted at 160. For example, when client delivery node 140 receives encoded frames of audio and/or video content from the primary delivery node 140, client delivery node 140 sends the encoded frames to client delivery node 142 and client delivery node 144 (e.g., by making copies of the received encoded frames as needed) without any caching or buffering, and without waiting for requests for additional frames from client delivery node 142 and client delivery node 144. In this way, the audio/video streaming, once it has begun, is a one-way stream. As a result, audio-video streaming is performed within the example environment with low overhead and with very low latency. However, in other implementations, delivery nodes can buffer samples (for example, in packets containing a media sample, such as a frame). For example, if a client delivery node 140 sends samples to multiple recipients, samples can be maintained in a single buffer or in multiple buffers until the media samples have been sent the relevant recipients.

In addition, the example environment 100 supports efficient forking of audio/video streams (e.g., with low overhead). For example, an audio video stream can be forked so that the audio/video stream can be delivered to additional end-user clients and/or additional delivery nodes. Forking is performed by sending stream metadata to the new end-user clients and/or delivery nodes. Once the end-user clients and/or delivery nodes have selected the stream (or streams) they want, streaming begins and continues without any additional requests from the new end-user clients and/or delivery nodes. In this way, forking can be performed efficiently to deliver the audio/video stream to many additional streaming clients. For example, if thousands of new streaming clients join, they can be efficiently added by sending stream metadata, receiving requests for selected audio/videos streams, and forking the audio/video streams (which are already being received by the delivery node) to send the audio/video streams to the new streaming clients.

In a typical streaming scenario, the primary delivery node 120 provides a variety of audio/video streams of different quality, all encoding the same audio and/or video content received from the media source 110. For example, the primary delivery node 120 could provide a high quality audio/video stream, a medium quality audio/video stream, and a low quality audio/video stream containing the same audio and/or video content that was received from the media source 110, just encoded in different qualities. Each end-user client and delivery node can select which audio/video streams to receive. For example, a given end-user client can receive stream metadata describing the available audio/video streams and select one to receive. A given client delivery node could receive all available audio/video streams (e.g., so that it can provide all options to downstream client delivery nodes and/or end-user clients) or only a subset of the available audio/video streams (e.g., the client delivery node may only receive low and medium quality streams if it is only currently serving end-user clients that have selected those quality streams).

The different quality audio/video streams that are provided within the example environment 100 are client-independent audio/video streams that are not specific to any given streaming client. For example, if a new end-user client wants to begin receiving a stream, it first receives stream metadata describing the available audio/video streams, each having its associated pre-defined quality. The end-user client selects the desired quality audio/video stream to receive and begins receiving the selected audio/video stream. The selected audio/video stream is not tailored to the specific streaming client, but the streaming client can select the desired quality audio/video stream (from those available) based on various criteria, such as available computing resources at the streaming client, current network bandwidth and conditions, etc.

The example environment 100 can deliver audio/video streams using a variety of transport layer network protocols. For example, delivery of audio/video streams can be performed using lossless transport protocols (e.g., transmission control protocol (TCP)) or a lossy transport protocol (e.g., user datagram protocol (UDP)).

Using the techniques described above with regard to the example environment 100, streaming of audio and/or video content can be performed to many end-user clients (e.g., 100,000 or more end-user clients) efficiently and with low latency (e.g., with less than one-second of latency). For example, a real-time media session (e.g., a real-time audio and/or video meeting) can be provided by the media source 110, travel through various primary delivery nodes (e.g., primary delivery node 120) and/or client delivery nodes (e.g., client delivery nodes 140, 142, and 144), and reach the end-user clients (e.g., end-user clients 130, 150, and 152) with low latency and low overhead. Therefore, using the techniques described herein, the streaming architecture can support virtually any number of end-user clients while still allowing the end-user clients to have meaningful interaction or engagement with the streaming media content if desired (e.g., if the streaming media content is part of a real-time meeting, then end-user clients could interact with the meeting participants in real-time).

The streaming clients can switch between various quality audio/video streams as needed. For example, a given end-user client can send a message to the delivery node to switch to a different quality audio/video stream. In response, the delivery node stops sending the old quality audio/video stream and starts sending the new quality audio/video stream. The streaming client can perform the switch based on previously received stream metadata or request (or receive) updated stream metadata (e.g., the available pre-defined quality audio-video streams may have changed). New track setup information can be sent to a streaming client prior to sending packets for the newly selected stream.

The example environment 100 depicts a single primary delivery node 120. However, other implementations can include any number of primary delivery nodes, each receiving the streaming audio and/or video content from the media source 110 and/or from another primary delivery node. Further, each of the primary delivery nodes can stream to any number of clients and/or delivery nodes (e.g., primary delivery nodes or client delivery nodes).

Figure 2:
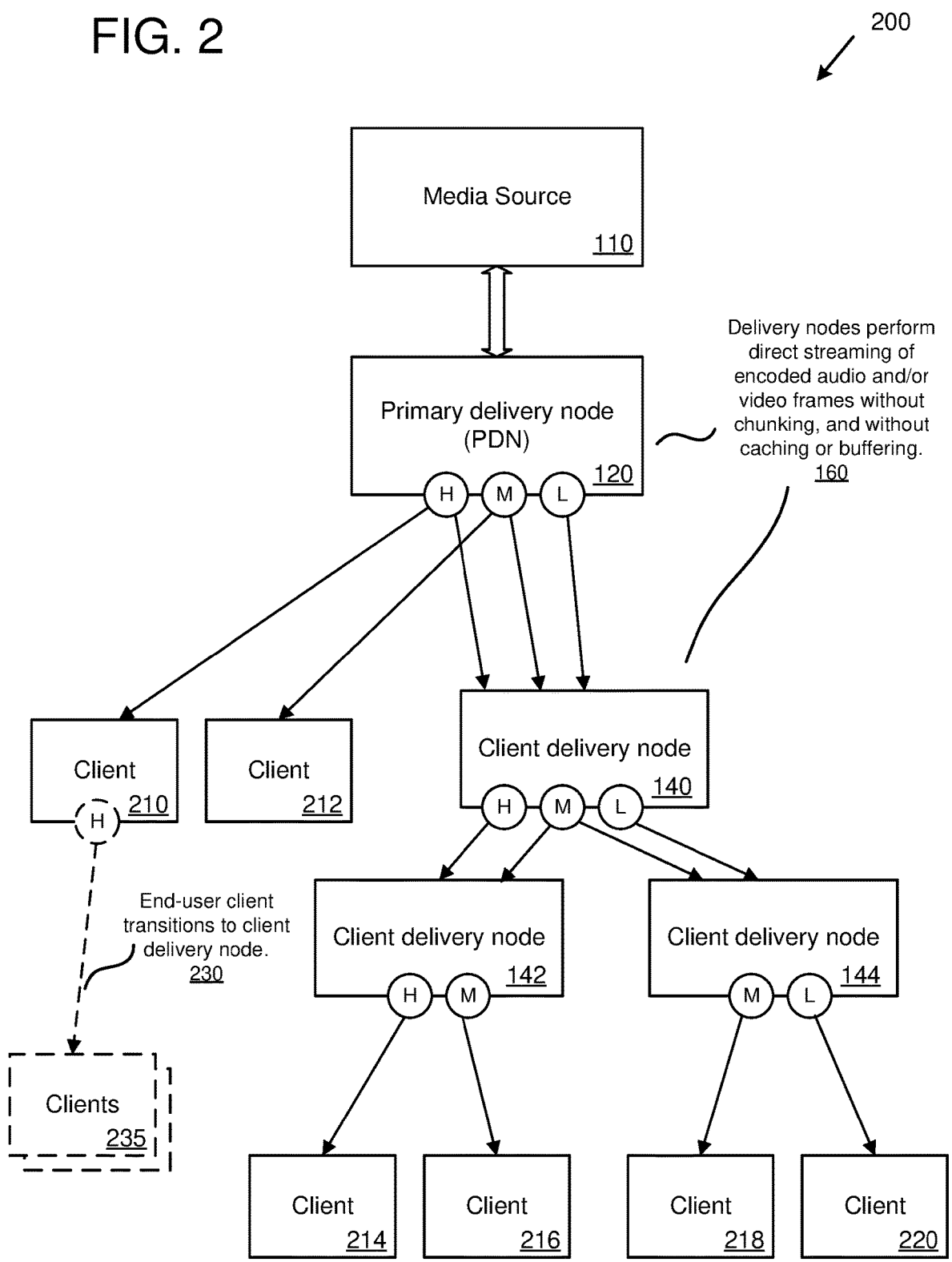
FIG. 2) is a diagram depicting an example environment for low-latency real-time streaming of media content, including streaming of multiple pre-defined audio/video streams.

FIG. 2 is a diagram depicting an example environment 200 for low-latency real-time streaming of media content, including streaming of multiple pre-defined audio/video streams. The example environment 200 is similar to the example environment 100 depicted in FIG. 1, with additional description of how the multiple pre-defined audio/video streams operate.

As depicted in the example environment 200, the primary delivery node 120 has a set of pre-defined available audio/video streams. In this example, the set of pre-defined available audio/video streams include a high quality (H) audio/video stream, a medium quality (M) audio/video stream, and a low quality (L) audio/video stream. The set of pre-defined available audio/video streams can be generated by the primary delivery node 120. For example, the primary delivery node 120 can receive the streaming audio and/or video content from the media source 110 and generate the high, medium, and low quality representations of the streaming audio and/or video content by encoding using one or more audio and/or video codecs. The primary delivery node 120 could also receive the high, medium, and low quality streams as already encoded streams representing the streaming audio and/or video content (e.g., from the media source 110 or from another source, such as an intermediary media encoding and/or compositing service).

The primary delivery node 120 streams one or more of the pre-defined available audio/video streams to end-user clients and/or client delivery nodes. In some implementations, the primary delivery node 120 provides stream metadata to requesting end-user clients and client delivery nodes, which then request one or more of the pre-defined available audio/video streams to receive. For example, end-user client 210 has selected the high-quality audio/video stream to receive, while end-user client 212 has selected the medium quality audio/video stream to receive. Client delivery node 140 has selected the entire set of pre-defined available audio/video streams (high, medium, and low quality) to receive, and therefore will be able to stream any of the audio/video streams in the set.

In this example, client delivery node 142 has requested the high and medium quality pre-defined audio/video streams, and is streaming the high-quality audio/video stream to end-user client 214 and the medium quality audio/video stream to end-user client 216. Client delivery node 144 has requested the medium and low quality pre-defined audio/video streams, and is streaming the medium quality audio/video stream to end-user client 218 and the low-quality audio/video stream to end-user client 220.

In some implementations, an end-user client can transition to become a client delivery node and stream audio/video streams to other end-user clients and/or client delivery nodes. In this example, end-user client 210 has transitioned into a client delivery node, as depicted at 230. After becoming a client delivery node, end-user client 210 can provide stream metadata to other end-user clients and/or client delivery nodes, receive requests for available pre-defined audio/video streams, and stream selected audio/video streams. In this example, end-user client 210 (now also operating as a client delivery node) is streaming the high-quality audio/video stream to end-user clients 235.

In some implementations, the media source 110 represents a number of components (e.g., a number of cloud services, which could be running localized or distributed arrangement). For example, the media source 110 could include comprise a media processor component that receives real-time audio and/or video content (e.g., from a real-time meeting), a media composition runtime component that receives the real-time audio and/or video content from the media processor and composites the content into one or more audio/video streams (e.g., including multiple pre-defined quality streams) that are provided to one or more primary delivery nodes, and a lookup service that facilitates discovery and communication between the primary delivery nodes and the other components.

Example 4—Example Streaming Protocol

In the technologies described herein, a new streaming protocol is provided for low-latency real-time streaming of media content. In some implementations, the new streaming protocol is a one-way streaming protocol that does not permit receiving requests.

The new streaming protocol includes a setup procedure. During the setup procedure, the streaming client sends a request (e.g., to a delivery node) for available audio/video streams. In some implementations, the request is sent as a hypertext transfer protocol (HTTP) request. In response, the streaming client receives stream metadata (also referred to as a track list) describing the pre-defined audio/video streams that are available. For example, a number of pre-defined quality audio/video streams may be available, such as a high-quality stream, a medium quality stream, and a low-quality stream.

The streaming client then selects one of the pre-defined audio/video streams to receive. In some implementations, the request for one of the pre-defined audio/video streams is sent (e.g., to a delivery node) as an HTTP request. In response, the streaming client receives one or more track setup objects. Each track setup object describes the properties of a corresponding track of the selected audio/video stream. An example track setup object describing an H.264 video track could include information such as: frame rate, sequence parameter set (SPS) and the picture parameter set (PPS) information, profile information, and/or other information that allows the streaming client to configure its decoder for receiving and decoding H.264 encoded video frames. An example track setup object describing an Opus audio track could include information such as: sample rate, sample duration, number of channels, and/or other information that allows the streaming client to configure its decoder for receiving and decoding Opus encoded audio data.

The new streaming protocol is then used to stream encoded audio and/or video frames to the streaming client. The new streaming protocol streams the encoded audio and/or video frames as independently encoded audio and/or video frames without grouping frames into chunks for streaming. In addition, the encoded audio and/or video frames streamed by the new streaming protocol are not seekable (i.e., the client cannot send a request for a specific frame or chunk, such as using a timestamp). In other words, the new protocol is a stream-based protocol that streams encoded audio and/or video frames in real time and without caching or buffering the frames. The client receives the audio/video stream and begins decoding in real-time (e.g., beginning with the next key frame).

In some implementations, the new streaming protocol is a one-way streaming protocol that does not permit receiving requests. In these implementations, requests that are received from downstream streaming clients are received using a different network protocol, such as HTTP. For example, a primary delivery node can receive HTTP requests from streaming clients for available audio/video streams and HTTP requests from streaming clients for selected audio/video streams to begin streaming. The primary delivery node can use the new streaming protocol when sending data to the steaming client (e.g., when sending stream metadata, when sending track setup objects, and when streaming encoded audio and/or video frames).

The new streaming protocol is defined at a higher layer than the transport layer. Therefore, the new streaming protocol can use a variety of transport layer network protocols for delivering the encoded audio and/or video frames. For example, the new streaming protocol can use a lossless transport protocol (e.g., TCP) or a lossy transport protocol (e.g., UDP).

Example 5—Example Methods for Low-Latency Real-Time Streaming of Media Content

In any of the examples herein, methods can be provided for low-latency real-time streaming of media content. The methods can be performed by delivery nodes (e.g., primary delivery nodes and/or client delivery nodes) or by streaming clients.

Figure 3:
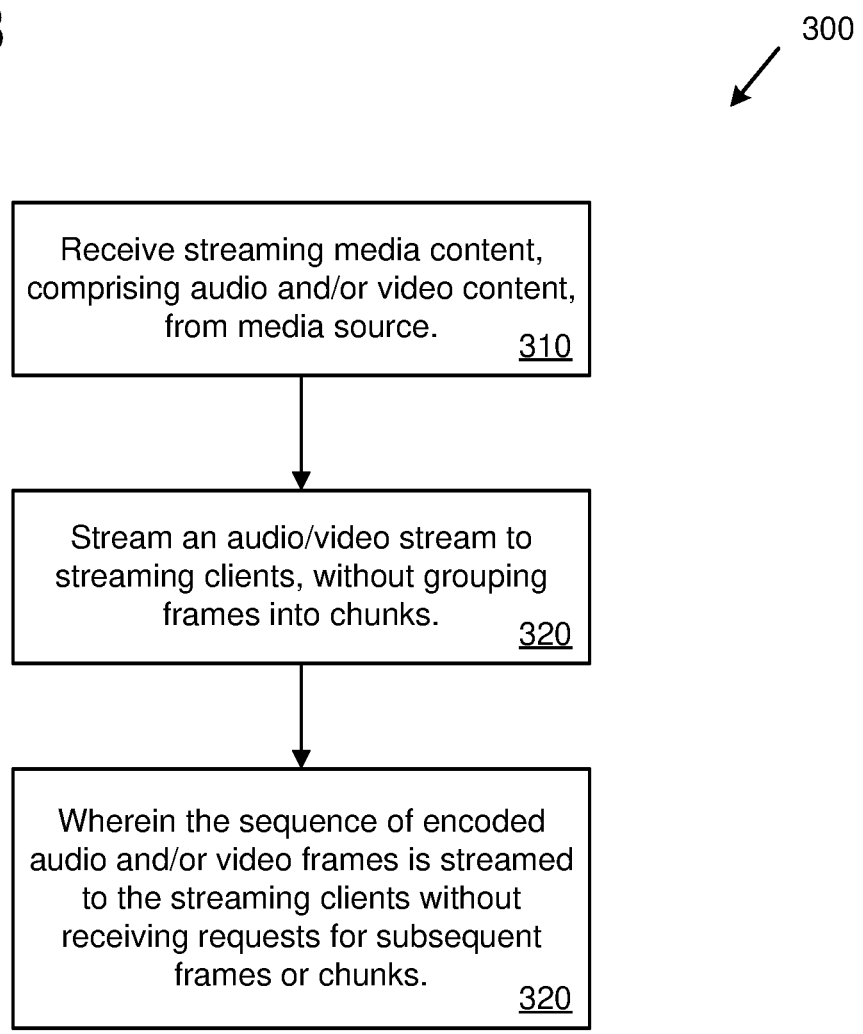
FIG. 3) is a flowchart of an example method for low-latency real-time streaming of media content.

FIG. 3 is a is a flowchart of an example method 300 for low-latency real-time streaming of media content. For example, the example method 300 can be performed by a delivery node, such as primary delivery node 120 or client delivery node 140, 142, or 144.

At 310, streaming media content is received from a media source. The streaming media content includes audio and/or video content.

At 320, an audio/video stream is streamed to one or more streaming clients. The audio/video stream is streamed as a sequence of encoded audio and/or video frames that are generated from the media content. The sequence of encoded audio and/or video frames is streamed as independently encoded audio and/or video frames without grouping the frames into chunks. In some implementations, the audio/video stream is streamed to the one or more streaming clients without caching or buffering the encoded audio and/or video frames.

At 330, the sequence of encoded audio and/or video frames is streamed to the one or more streaming clients as a one-way stream and without receiving requests form the one or more streaming clients for subsequent frames or chunks. In some implementations, the sequence of encoded audio and/or video frames is streamed using a streaming protocol that does not support sending requests to the delivery node of subsequent frames or chunks.

Figure 4:
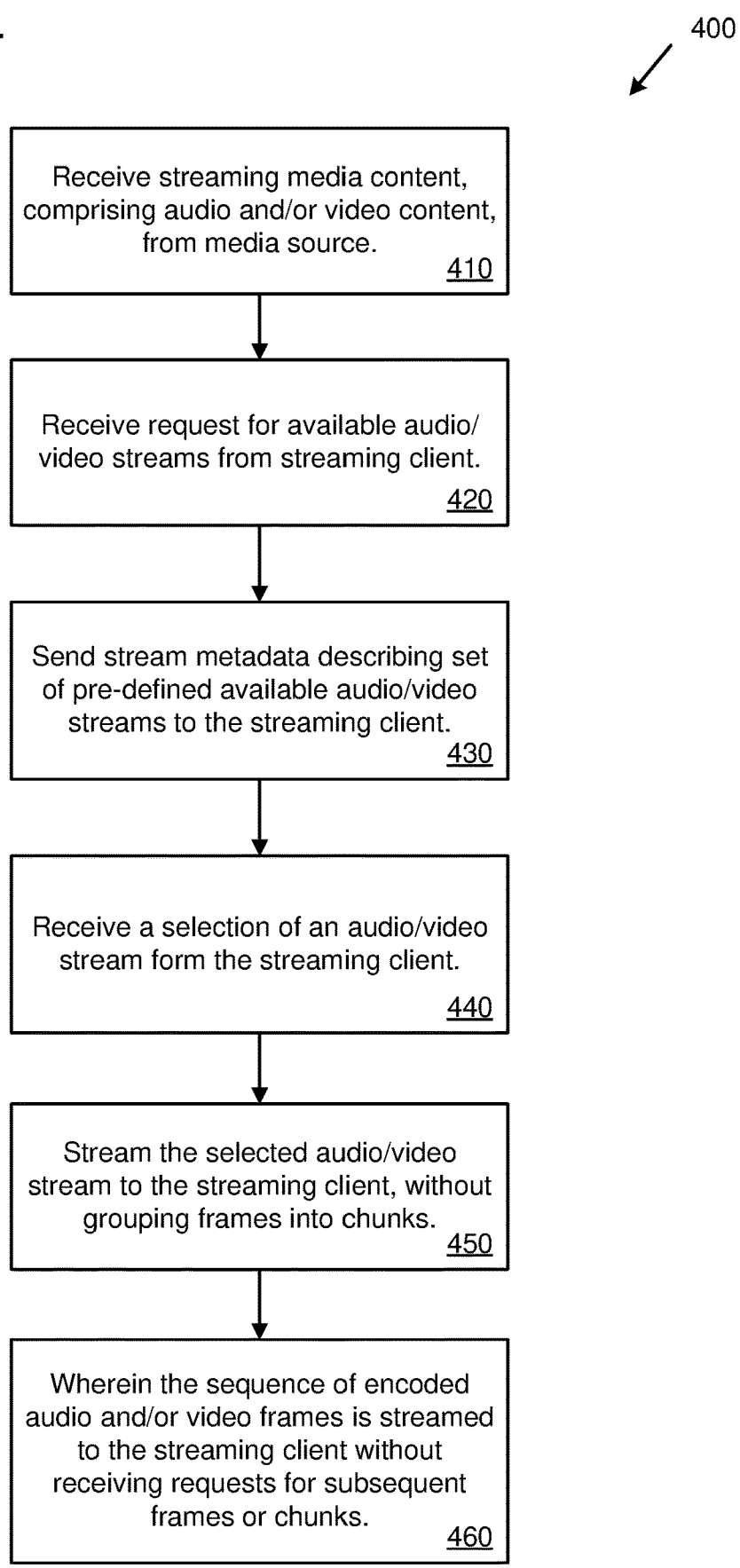
FIG. 4) is a flowchart of an example method for low-latency real-time streaming of media content, including sending stream metadata.

FIG. 4 is a is a flowchart of an example method 400 for low-latency real-time streaming of media content, including sending stream metadata. For example, the example method 400 can be performed by a delivery node, such as primary delivery node 120 or client delivery node 140, 142, or 144.

At 410, streaming media content is received from a media source. The streaming media content includes audio and/or video content.

At 420, a request for available audio/video streams is received from a streaming client. For example, the request can include an indication (e.g., a unique identifier) of the streaming media content that the streaming client wants to receive. In some implementations, the request is received from the streaming client via an HTTP request.

At 430, in response to the request at 420, stream metadata is sent to the streaming client. The steam metadata describes a set of pre-defined available audio/video streams (having corresponding pre-defined qualities) for streaming the streaming media content. The set of pre-defined available audio/video streams are client-independent audio/video streams that are not specific to any given streaming client.

At 440, a selection of an audio/video stream (from the set of pre-defined available audio/video streams) is received from the streaming client. In some implementations, the request is received from the streaming client via an HTTP request.

At 450, in response to the selection at 440, the selected audio/video stream is streamed to the streaming client. The selected audio/video stream is streamed as a sequence of encoded audio and/or video frames that are independent encoded audio and/or video frames without grouping frames into chunks. In some implementations, the audio/video stream is streamed to the streaming client without caching or buffering the encoded audio and/or video frames At 460, the sequence of encoded audio and/or video frames is streamed to streaming client as a one-way stream and without receiving requests from the streaming client for subsequent frames or chunks. In some implementations, the sequence of encoded audio and/or video frames is streamed using a streaming protocol that does not support sending requests to the delivery node of subsequent frames or chunks.

Figure 5:
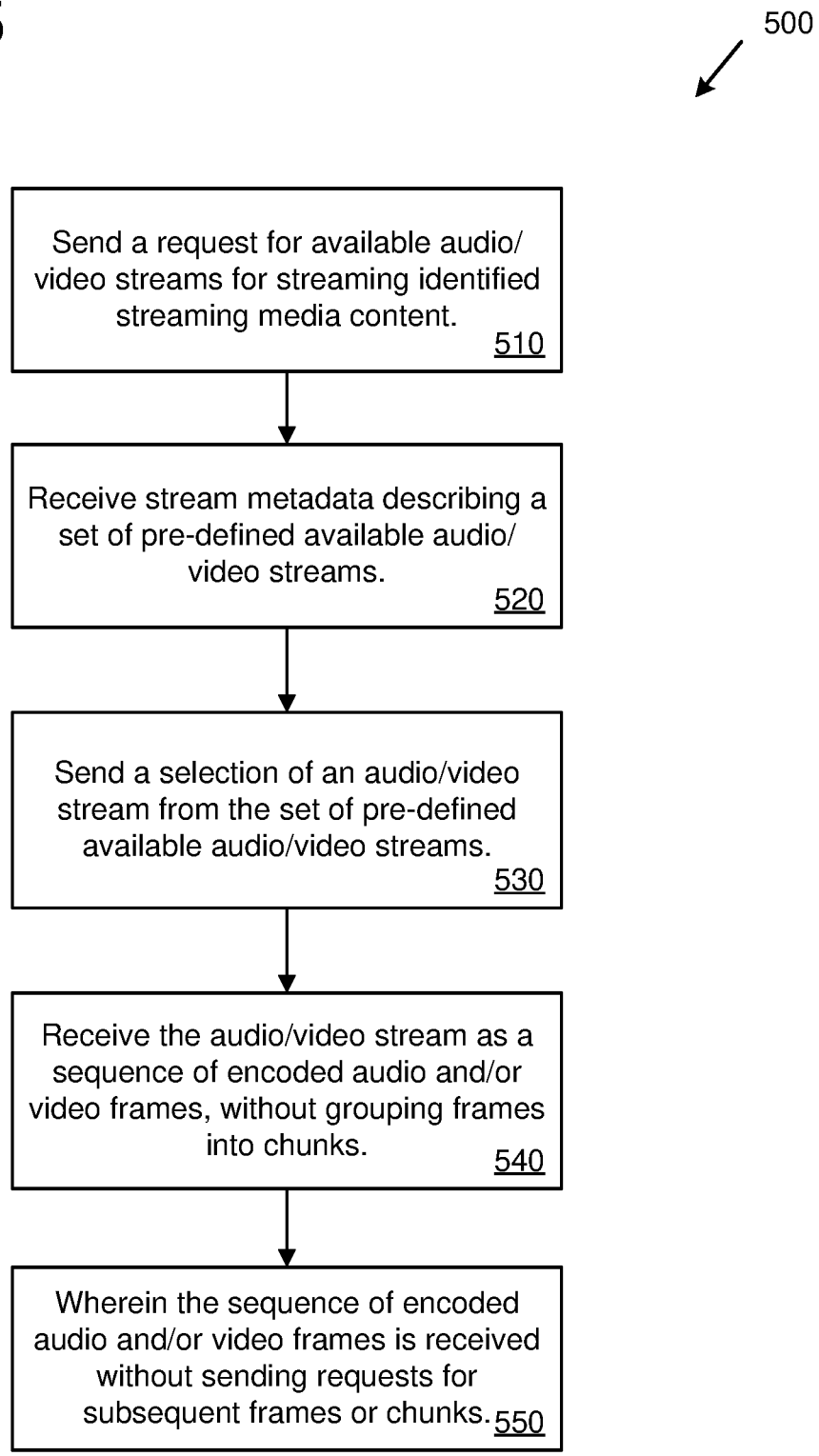
FIG. 5) is a flowchart of an example method for low-latency real-time streaming of media content, including using stream metadata to select an audio/video stream.

FIG. 5 is a is a flowchart of an example method 500 for low-latency real-time streaming of media content, including using stream metadata to select an audio/video stream. For example, the example method 500 can be performed by a streaming client, such as an end-user client or a client delivery node.

At 510, a request is sent (e.g., to a delivery node) for available audio/video streams for streaming identified streaming media content. For example, the request can identify (e.g., using a unique identifier) the streaming media content.

At 520, in response to the request at 510, stream metadata is received. The stream metadata describes a set of pre-defined available audio/video streams for streaming the streaming media content. The set of pre-defined plurality of audio/video streams are client-independent audio/video streams that are not specific to any given streaming client.

At 530, a selection of an audio/video stream from the set of pre-defined available audio/video streams is sent (e.g., to the delivery node). For example, the stream metadata can include indications (e.g., unique identifiers) of the pre-defined available audio/video streams, which can be used when selecting the audio/video stream.

At 540, the audio/video stream that was selected at 530 is received. The audio/video stream is received as a sequence of encoded audio and/or video frames that are independently encoded audio and/or video frames without grouping frames into chunks.

At 550, the sequence of encoded audio and/or video frames is received as a one-way stream and without sending any requests (e.g., to the delivery node) for subsequent frames or chunks. In some implementations, the sequence of encoded audio and/or video frames is received using a streaming protocol that does not support sending requests to the delivery node of subsequent frames or chunks.

Example 6—Example Media Streams and Logical Buffers

As has been described, in disclosed techniques, media content is delivered to clients as a media stream (e.g., as a real-time media stream). For example, the media content of the media stream is available for delivery to the clients in real-time.

Due to the various network conditions that exist between the server and the clients, each client may be at a different position in the media stream. For example, a first client may be up-to-date (e.g., there is no media content waiting to be delivered to the first client) while a second client could have fallen behind (e.g., there is five seconds of media content waiting to be delivered to the second client).

In some implementations, each client (also referred to as a streaming client) has an associated logical buffer (also referred to as a buffer) that indicates the client's position in the media stream. In other words, the logical buffer contains the amount of media content that is waiting to be delivered to the client. In this way, the logical buffer also indicates whether a client has fallen behind the media stream. For example, if a given client has 10 seconds of media content in the client's logical buffer that has not yet been delivered to the given client, then the given client has fallen behind the media stream by 10 seconds. The logical buffers can be implemented in various ways. For example, a single memory buffer of media data can be maintained along with a location of each client's position in the single memory buffer. In some implementations, the collection of logical buffers for the streaming clients is referred to as a queue of buffers.

Figure 6:
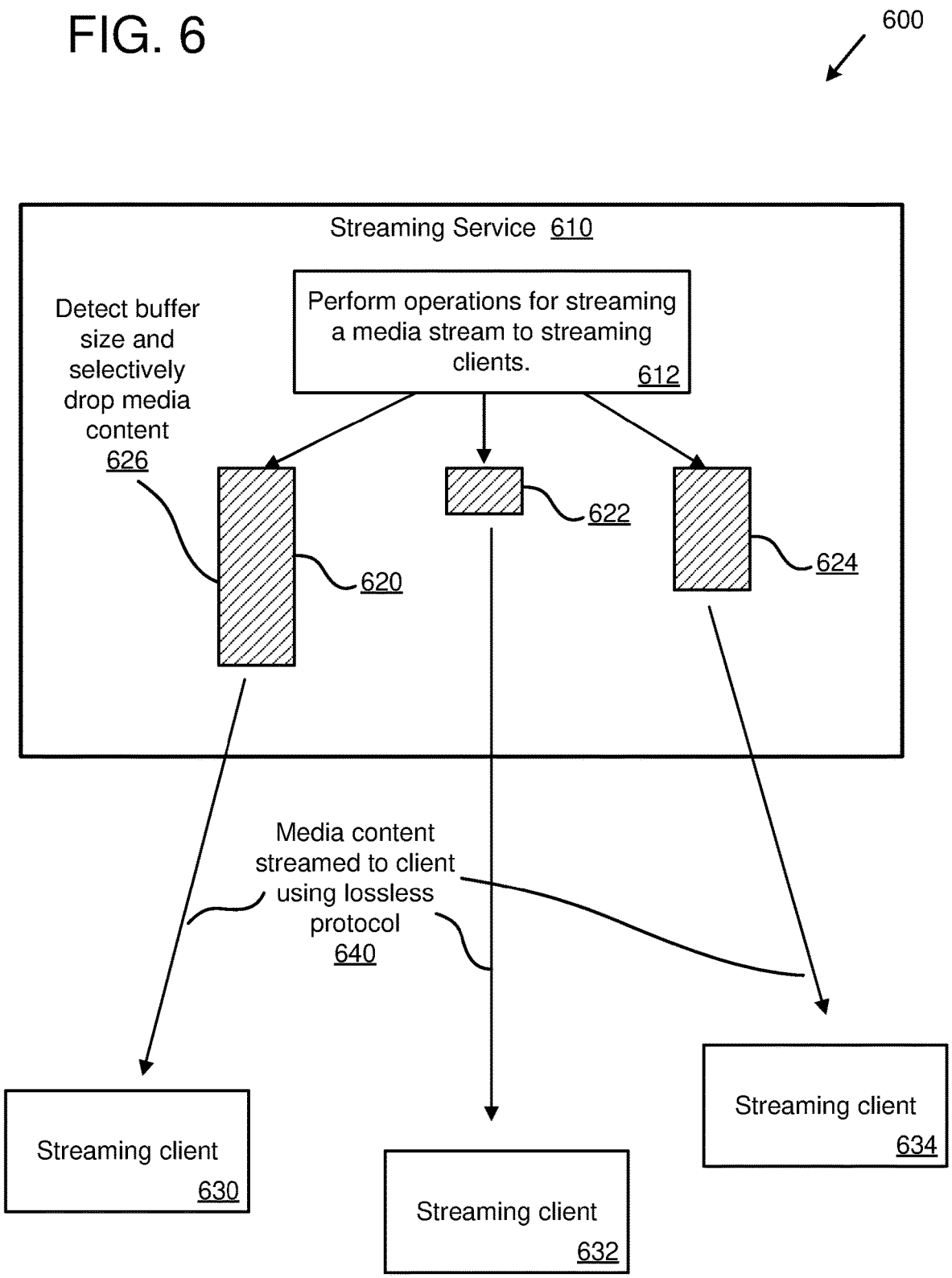
FIG. 6) is a block diagram depicting example environment for low-latency streaming of media content using a lossless protocol.

Example 7—Example Environments for Low-Latency Streaming of Media Content Using Lossless Protocols FIG. 6 is a diagram depicting example environment 600 for low-latency streaming of media content using a lossless protocol. The example environment 600 includes a streaming service 610. The streaming service 610 provides media content for streaming to streaming clients, including streaming clients 630, 632, and 634. The streaming service 610 can be implemented using various types of software and/or hardware computing resources, such as server computers, cloud computing resources, audio and/or video coding software, streaming software, etc.

The streaming service 610 performs various operations for streaming a media stream to streaming clients, as depicted at 612. For example, the operations can include receiving audio and/or video data (e.g., samples), encoding the audio and/or video data using various audio and/or video codecs, transmitting network packets containing encoded audio and/or video data to streaming clients using lossless protocols, managing buffers of encoded audio and/or video data, and/or selectively dropping audio and/or video data based on various criteria (e.g., buffer size).

In this example, the streaming service 610 is providing a media stream to three streaming clients, streaming client 630, streaming client 632, and streaming client 634. The streaming service 610 maintains a buffer (also referred to as a logical buffer) for each streaming client. Specifically, streaming client 630 is associated with buffer 620, streaming client 632 is associated with buffer 622, and streaming client 634 is associated with buffer 624. Each buffer indicates the encoded audio and/or video data waiting to be delivered to its respective streaming client.

The media stream has a current (most up-to-date) position, which is at the head of the stream (e.g., the current position in a real-time media stream). The head of the stream is represented by the top of the buffers 620, 622, and 624. As the media stream produces new audio and/or video data, it is encoded and added to the top of the buffers, as depicted by the arrows entering the buffers 620, 622, and 624. The position of a given streaming client in its corresponding buffer is represented by the bottom of its corresponding buffer (also referred to as the tail). The amount of encoded audio and/or video data in a given buffer indicates how far behind that streaming client is in the media stream. In other words, the location in the buffer of a given streaming client indicates how far behind the given streaming client is in the media stream. For example, if buffer 620 represents seven seconds of encoded audio and/or video data waiting to be delivered to streaming client 630, then streaming client 630 is seven seconds behind in the media stream.

The streaming service 610 selectively drops media content when a given streaming client is determined to have fallen behind in streaming the media stream. For example, streaming client 630 has fallen behind in the media stream due to the size of its associated buffer 620, as depicted at 626 (e.g., the buffer 620 could indicate that seven seconds of encoded audio and/or video data has been queued up and is waiting to be delivered to streaming client 630, which is over a threshold of five seconds). In another implementation, rather than, or in addition to, dropping media content when a streaming client has fallen behind, the streaming service can switch to a lower quality stream. A given streaming client 630 can be considered to have fallen behind (e.g., as a condition) based on various criteria, such as the amount encoded audio and/or video data in its buffer (e.g., based on number of frames or other measure) and/or the amount of time represented by the encoded audio and/or video data in its buffer (e.g., a number of seconds of playback represented by the encoded audio and/or video data in the buffer). In another implementation, a streaming client 630 can be considered to have fallen behind if latency exceeds a threshold, such as a configurable threshold, including latency due to network loss or bandwidth limitations.

The streaming service 610 can determine whether a given streaming client has fallen behind by monitoring the buffers (e.g., by monitoring buffers 620, 622, and 624). The streaming service 610 can monitor the buffers on a continuous or periodic basis. Based on the monitoring, the streaming service 610 can determine when a streaming client has fallen behind. In some implementations, when a buffer indicates more than a threshold amount of encoded audio and/or video data (or corresponding playback time), the streaming service 610 determines that the streaming client associated with the buffer has fallen behind.

When the streaming service 610 determines that a given streaming client has fallen behind in streaming the media stream (e.g., when there is more than a threshold amount of encoded audio and/or video data in the given streaming client's buffer), then the streaming service 610 selectively drops audio and/or video data to be streamed to the streaming client. When the streaming service 610 selectively drops audio and/or video data, it drops a portion of the audio and/or video data that would otherwise be streamed to the streaming client. For video data, the streaming service 610 selects the portion to drop based on scalability information (e.g., dropping one or more layers) and/or long-term reference (LTR) frame information (e.g., dropping one or more frames). For audio data, the streaming service 610 can adjust the forward error correction (FEC) reliability level (e.g., which results in dropping redundant audio data that would otherwise be transmitted to a streaming client). For example, if there are multiple network connections between the streaming service 610 and a given streaming client, then audio data for one or more of the network connections (e.g., redundant audio data) can be dropped.

The streaming service 610 operates without using per-client quality feedback from the streaming clients (e.g., from streaming clients 630, 632, and 634). For example, when the streaming service 610 determines whether a given streaming client has fallen behind in streaming the media stream, the streaming service 610 does so without using quality feedback from the streaming clients (e.g., the streaming clients do not send any information to the streaming service indicating that the streaming clients are experiencing network loss or delay, or decoding slowdown). In some implementations, the streaming service 610 uses only server-side streaming information when determining whether any of the plurality of streaming clients has fallen behind. For example, the server-side streaming information can include the condition of the buffers (e.g., how much encoded media data is in a given buffer waiting to be streamed), network statistics (e.g., packet delivery statistics or loss statistics observed by the streaming service 610), and/or other information that is observed by the streaming service 610, but that is not received from the streaming clients.

In some implementations, the streaming service 610 selectively drops video data when a streaming client has fallen behind based, at least in part, on scalability information. For example, the streaming service 610 can drop one or more layers of video data defined by the temporal scalability information, spatial scalability information, and/or quality scalability information (e.g., by dropping one or more layers other than a base layer). In some implementations, the scalability information is defined according to the scalable video coding (SVC) standard.

In some implementations, the streaming service 610 selectively drops video data when a streaming client has fallen behind based, at least in part, on LTR frame information. For example, the LTR frame information can indicate a dependency structure of frames (e.g., comprising instantaneous decoder refresh (IDR) frames, LTR frames, predicted (P) frames, and/or other types of frames). Depending on the LTR frame information, certain frames could be dropped (e.g., predicted frames).

In some implementations, the streaming service 610 selectively drops video data when a streaming client has fallen behind based, at least in part, on both scalability information and LTR frame information. For example, one or more layers can be dropped where the layers are scalability layers that are defined according to LTR frame information (e.g., that have a particular LTR dependency structure of frames).

Figure 7:
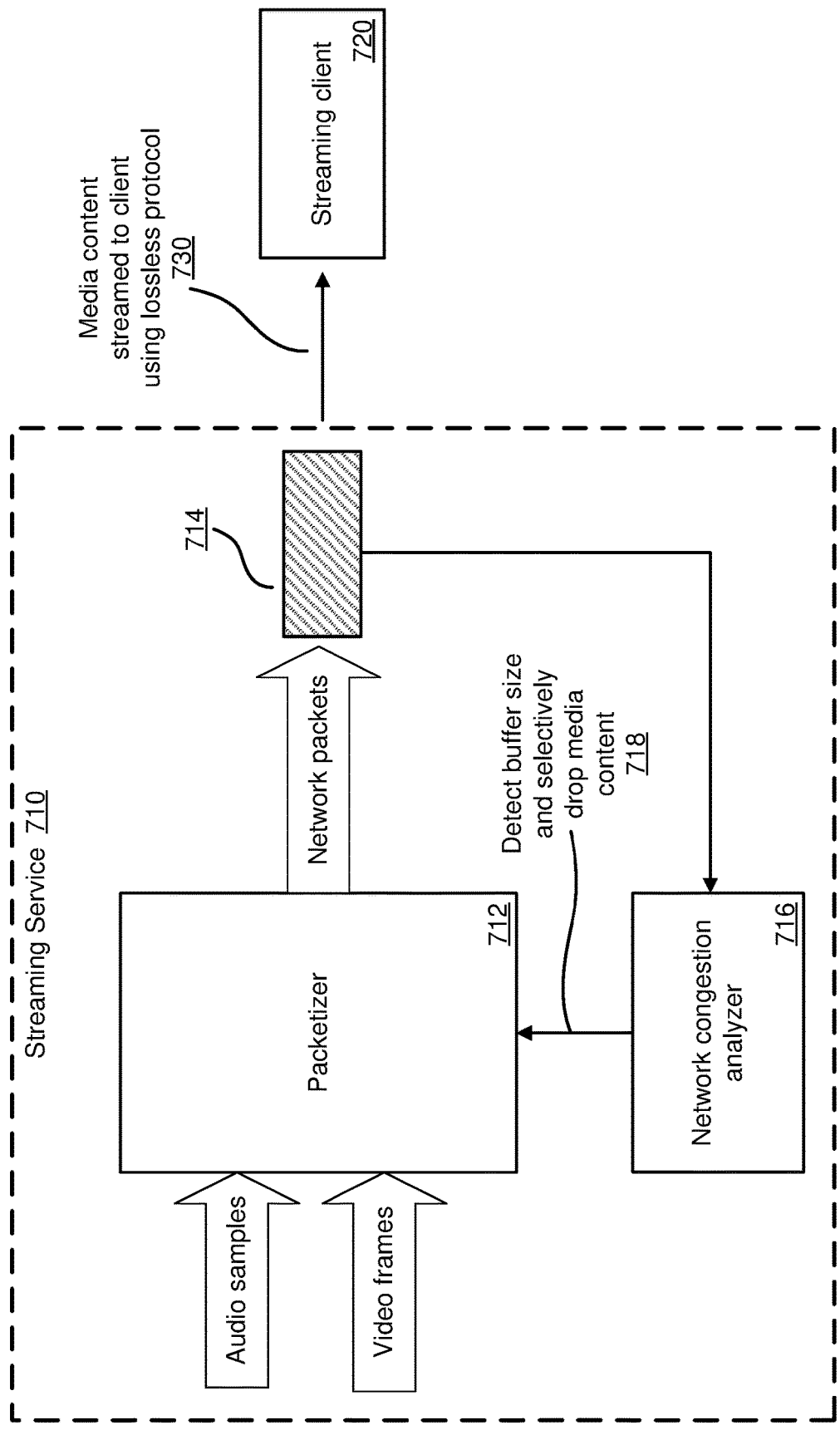
FIG. 7) is a diagram depicting an example environment for selectively dropping media content when performing low-latency streaming using a lossless protocol.

FIG. 7 is a diagram depicting example environment 700 for selectively dropping media content when performing low-latency streaming using a lossless protocol. The example environment 700 includes a streaming service 710. The streaming service 710 provides media content for streaming-to-streaming clients, including streaming client 720. The streaming service 710 can be implemented using various types of software and/or hardware computing resources, such as server computers, cloud computing resources, audio and/or video coding software, streaming software, etc.

As depicted in the example environment 700, a packetizer 712 receives a media stream as a sequence of encoded audio samples and/or video frames and generates network packets. The network packets are saved in a buffer 714 for sending to the streaming client 720. The streaming service 710 delivers the network packets from the buffer 714 to the streaming client 720 (e.g., as fast as possible) using a lossless protocol, as depicted at 730. Depending on various factors, such as network conditions, the number of network packets (and the corresponding amount of encoded audio and/or video data) in the buffer 714 may grow or shrink.

As depicted in the example environment 700, the streaming service 710 includes a network congestion analyzer 716. The network congestion analyzer 716 analyzes the buffer 714 to determine whether the streaming client 720 has fallen behind (e.g., whether there is more than a threshold amount of encoded audio and/or video data in the buffer 714 waiting to be sent to the streaming client 720).

When the streaming client 720 has fallen behind, the network congestion analyzer 716 signals the packetizer 712 to selectively drop media content (also referred to as throttling), as depicted at 718. For example, throttling can be performed by selectively dropping non-essential scalability (e.g., SVC) layers. In some implementations, there are multiple layers, one or more of which can be dropped based on various criteria (e.g., based on the amount data in the buffer 714 and/or other criteria, such as how fast the buffer 714 is growing).

When the streaming client 720 has caught up (e.g., when the amount of data in the buffer 714 falls below the threshold), the media stream can be restored to its original state (e.g., media data will no longer be dropped). However, if a long-term network condition (e.g., bandwidth limitation) is detected, then long-term changes can be made to the media stream. For example, the streaming client 720 can be moved to a different pre-defined media stream that is encoded at a lower video resolution and/or at a lower frame rate.

The example environment 700 depicts one way of implementing the streaming service 710. Other implementations could use different components (e.g., components for encoding audio and/or video data, components for generating network packets, components for monitoring buffer conditions, components for transmitting network packets, components for selectively dropping media data, and/or other components). In some implementations, the streaming service 610 uses the components depicted for the streaming service 710.

The example environment 700 depicts one streaming client 720 and its associated buffer 714 for ease of illustration. However, the example environment 700 supports any number of streaming clients and associated buffers.

In some implementations, streaming is performed (e.g., within example environments 600 or 700) by streaming a sequence of encoded audio and/or video frames without grouping frames into chunks for delivery. In other words, the streaming clients receive the encoded audio and/or video data without sending requests for a next chunk of streaming content (as would normally be done with a content delivery network). As a result, streaming is performed with low overhead and very low latency (e.g., no requests from the streaming clients for subsequent chunks of streaming content).

In the streaming technologies described herein, the media streams that are streamed to the streaming clients are not specific to any given streaming client. In other words, the streaming client does not negotiate streaming parameters that are specific to the streaming client. However, a number of pre-defined media streams (e.g., with varying quality and configuration) can be provided by a streaming service (by streaming service 610 or 710), and the streaming service can assign streaming clients to one of the available pre-defined media streams.

Using the techniques described above with regard to the example environments 600 and/or 700, streaming of audio and/or video content can be performed to many streaming clients (e.g., 100,000 or more streaming clients) efficiently and with low latency (e.g., with less than one-second of latency). Low latency can be maintained by selectively dropping audio and/or video data when a streaming client falls behind. Therefore, using the techniques described herein, the streaming environment can support virtually any number of streaming clients while still allowing the streaming clients to have meaningful interaction or engagement with the streaming media content if desired (e.g., if the streaming media content is part of a real-time meeting, then streaming clients could interact with the meeting participants in real-time).

In some implementations, a plurality of network connections (e.g., a plurality of TCP connections) are used for streaming media content to a given streaming client. The plurality of network connections can include one or more reliable, semi-reliable, and/or non-reliable network connections (also referred to as network channels). For example, a first network connection that provides a higher level of reliability (e.g., with more retries) can be used to deliver higher priority media content (e.g., base layer content) while a second network connection that provides a lower level of reliability (e.g., with fewer retries) can be used to deliver lower priority media content (e.g., layers other than the base layer). In some implementations, multiple network connections (e.g., two or more) are used for streaming media content, each with their own reliability level (e.g., number of retries) and configuration (e.g., forward error correction (FEC) configuration).

In some implementations, quality can be improved by using multiple network connections. For example, if the same content (e.g., encoded audio and/or video data) is sent via multiple connections, then the content that arrives first can be utilized, thus reducing latency. In some implementations, redundant media content is distributed among multiple connections (e.g., in a round robin manner or using another distribution scheme). Such solutions can reduce latency (e.g., by using the first arriving copy of the media content) and/or improve reliability (e.g., if a given network connection is degraded or fails).

In some implementations, the number of network connections is dynamically determined based on various criteria. For example, the number of network connections can be dynamical determined (and dynamically varied) based on parameters such as round-trip-time (RTT), profile information (e.g., location, network type, etc.), machine learning models, etc. In some implementations, streaming begins with a single network connection, and upon detecting poor network conditions, multiple network connections are enabled.

Example 8—Example Layer Configurations

In the technologies described herein, video data is selectively dropped when a streaming client has fallen behind based, at least in part, on scalability information (e.g., temporal scalability information, spatial scalability information, and/or quality scalability information) and/or LTR frame information. For example, a configuration of scalability layers (e.g., SVC layers) can be used in which the video frames are also organized according to LTR frame information. One or more of the scalability layers can then be dropped when streaming to a streaming client that has fallen behind in streaming the media stream.

To enable dropping of layers when streaming media content, scalability uses the concept of layers. Depending on the configuration, video frames of a layer can be dropped without significantly affecting video quality. For example, layers can be encoded with different frame rates, resolutions, or other encoding parameters.

LTR frame information can be used when creating a layer configuration by defining a dependency chain of frames (also referred to as a dependency structure) for the various layers. If any of the P frames are not received, video playback can be recovered at the next LTR frame. Depending on the frequency of LTR frames, recovery may be unnoticeable or almost unnoticeable.

Figure 8:
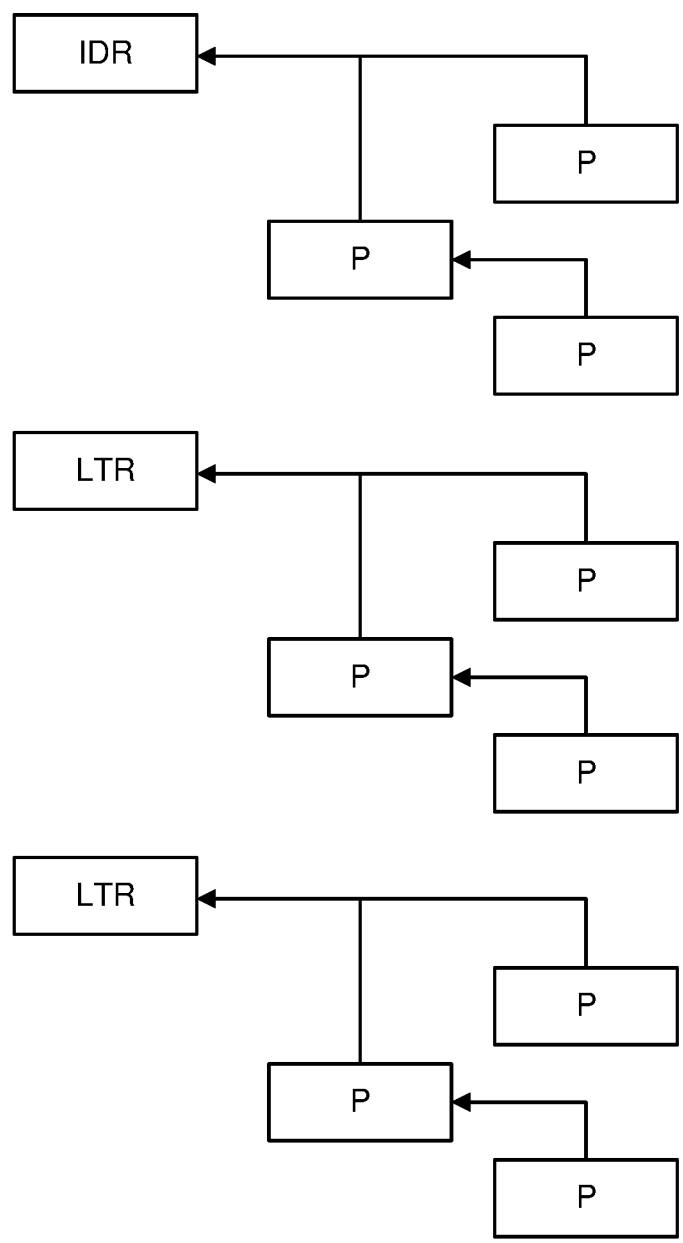
FIG. 8) is a diagram depicting an example layer configuration for streaming video data that supports selectively dropping layers when performing low-latency streaming.

FIG. 8 is a diagram depicting an example layer configuration 800 for streaming video data that supports selectively dropping layers when performing low-latency streaming using a lossless protocol. The example layer configuration 800 has three layers: layer 0, layer 1, and layer 2. Layer 0 is the base layer and contains an IDR frame and two LTR frames. Layer 1 contains P frames with a specific dependency structure. Layer 2 also contains P frames with a specific dependency structure.

Using the example layer configuration 800, the video content of a media stream can be selectively dropped in an incremental fashion when a streaming client falls behind. For example, if a streaming client has fallen behind, layer 2 can be dropped, which still allows the streaming client to decode and play the video content with reasonable quality.

The following streaming options are available using the example layer configuration 300.

Layer 0+layer 1+layer 2, maximum quality playback (e.g., 30 frames per second (FPS))
Layer 0+layer 1, reduced quality playback (e.g., 15 FPS)
Layer 0, further reduced playback (e.g., 7.5 FPS)

The example layer configuration 800 is just one example layer configuration that can be used for streaming data that supports selectively dropping layers. Other configurations can use a different number of layers and/or different frame dependency (e.g., a different arrangement and/or frequency of IDR frames, LTR frames, P frames, and/or different frame types).

Example 9—Low-Latency Streaming of Media Content Using Semi-Reliable Modes

In some implementations, media content is streamed using a protocol that provides semi-reliable network packet delivery (also referred to as a semi-lossy protocol). Examples of protocols that provide semi-reliable network packet delivery include stream control transmission protocol (SCTP) and QUIC.

In a non-reliable mode, a network packet is delivered without retries. With semi-reliable modes, there is a limit placed on the total number of retries and/or the delivery attempt timeout. Therefore, semi-reliable modes provide better delivery probability than the non-reliable mode, but at the cost of potential additional latency.

In some implementations, the streaming service (e.g., streaming service 610 or 710) streams the media stream using a semi-lossy protocol instead of a lossless protocol. For example, when streaming using the SCTP protocol, the streaming service controls the nature of the semi-reliable delivery and applies different delivery modes based on the type of video content being streamed. In some implementations, the streaming service applies a first delivery mode when streaming independent video frames (e.g., I frames, LTR frames, and/or other types of independent frames) and a second delivery mode when streaming delta video frames (e.g., P frames). For example, the first delivery mode can perform up to five retries when delivering independent video frames to the streaming client, while the second delivery mode only tries once when delivering delta frames to the streaming client. Other implementations can use a different number of delivery modes (e.g., more than two delivery modes), each delivery mode for one or more specific types of video frames and having its own reliability properties.

In some implementations, streaming is performed using a semi-lossy protocol based on a layer configuration (e.g., based on the example layer configuration 800). For example, a first layer (e.g., layer 0) can be delivered with higher reliability (e.g., with more retries), while other layers (e.g., layers 1 and 2) are delivered with lower reliability (e.g., with fewer or no retries).

In some implementations, a plurality of network connections are used for streaming media content to a given streaming client. The plurality of network connections can include one or more reliable, semi-reliable, and/or non-reliable network connections. For example, a first network connection that provides a higher level of reliability (e.g., with more retries) can be used to deliver higher priority media content (e.g., base layer content) while a second network connection that provides a lower level of reliability (e.g., with fewer retries) can be used to deliver lower priority media content (e.g., layers other than the base layer). In some implementations, multiple network connections (e.g., two or more) are used for streaming media content, each with their own reliability level (e.g., number of retries) and configuration.

When using a semi-lossy protocol, the streaming client may receive packets out of order. Therefore, the streaming client can collect audio and/or video data in a jitter buffer. The size of the streaming client's jitter buffer can be adjusted based on network conditions.

Example 10—Example Methods for Low-Latency Streaming of Media Content

In any of the examples herein, methods can be provided for low-latency streaming of media content using lossless and/or semi-lossy protocol. Low-latency streaming can be implemented in a real-time streaming environment by selectively dropping media content when a streaming client has fallen behind (e.g., based on monitoring buffers).

Figure 9:
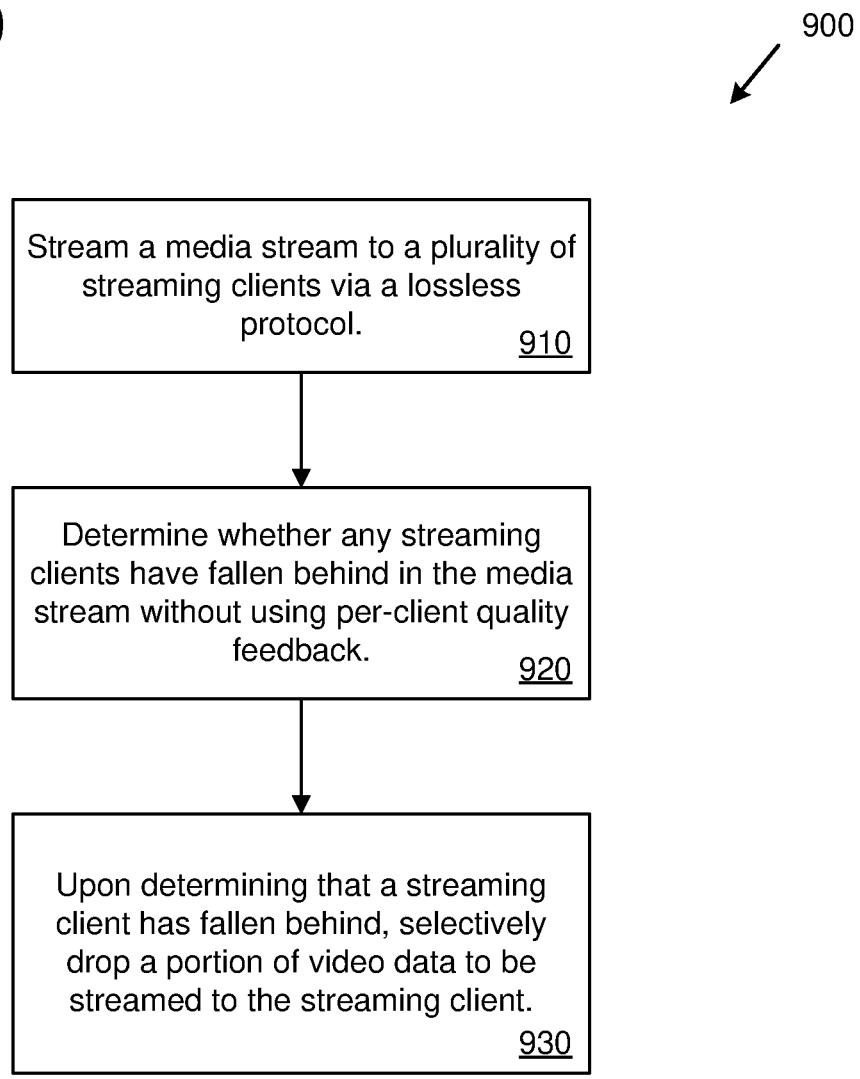
FIG. 9) is a flowchart of an example method for low-latency streaming of media content using a lossless protocol.

FIG. 9 is a is a flowchart of an example method 900 for low-latency streaming of media content using a lossless protocol. For example, the example method 800 can be performed by a streaming service, such as streaming service 610 or streaming service 710.

At 910, a media stream is streamed to a plurality of streaming clients using a lossless protocol. The media stream includes encoded video data. The media stream can also include encoded audio data.

At 920, the status of the streaming clients is checked to determine whether any of the streaming clients have fallen behind in streaming the media stream. For example, the streaming client buffers can be monitored to determine how much encoded video data is waiting to be delivered. When the amount of streaming data in a given streaming client's buffer is over a threshold value, the given streaming client can be determined to have fallen behind. The determination is made without using per-client quality feedback from the streaming clients.

At 930, upon determining that a streaming client has fallen behind, a portion of video data to be streamed to the streaming client is selectively dropped. The selective dropping is performed based on scalability information and/or LTR frame information of the video data. In some implementations, one or more scalability layers are dropped. In some implementations, both scalability information and LTR frame information are used to determine the portion of video data to selectively drop (e.g., based on a layer configuration that is also defined by an LTR frame dependency structure).

In some implementations, the example method 900 selectively drops audio content (e.g., in addition to selectively dropping video content). For example, when a streaming client has fallen behind (e.g., based on monitoring a buffer indicating encoded audio content to be delivered to the streaming client), audio content (e.g., redundant audio content) that would otherwise be streamed to the streaming client can be dropped (not transmitted to the streaming client). In some implementations, the selective dropping for audio content is performed by adjusting an FEC reliability level of audio data to be streamed to the streaming client.

Figure 10:
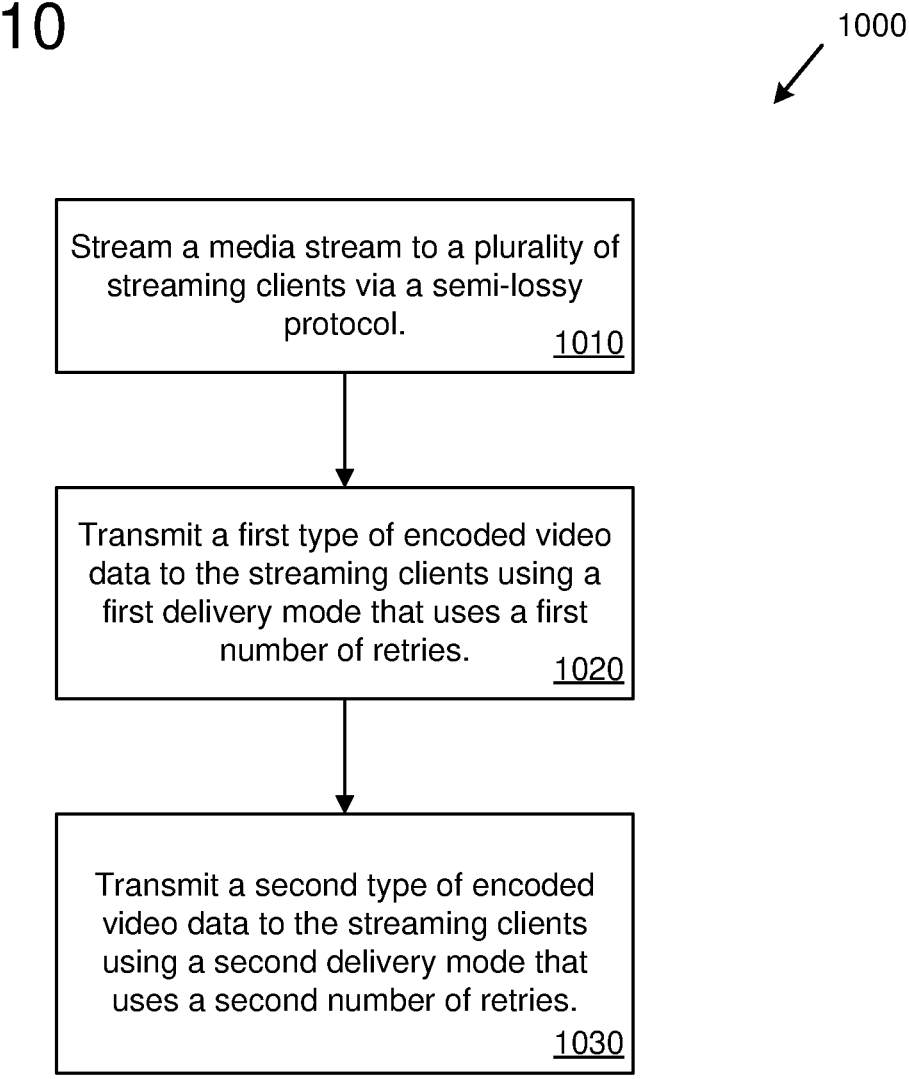
FIG. 10) is a flowchart of an example method for low-latency streaming of media content using a semi-lossy protocol.

FIG. 10 is a is a flowchart of an example method 1000 for low-latency streaming of media content using a semi-lossy protocol. For example, the example method 1000 can be performed by a streaming service, such as streaming service 610 or streaming service 710.

At 1010, a media streamed is streamed to a plurality of streaming clients using a semi-lossy protocol. The semi-lossy protocol uses a plurality of delivery modes for corresponding different types of encoded video data, where each of the plurality of delivery modes provides a different level of reliability. The media stream includes encoded video data. The media stream can also include encoded audio data.

At 1020, a first type of encoded video data is transmitted to the streaming clients using a first delivery mode. The first delivery mode uses a first number of retries. In some implementations, the first type of encoded video data is independent video frames (e.g., IDR frames, LTR frames, I frames, and/or other types of independent video frames).

AT 1030, a second type of encoded video data is transmitted to the streaming clients using a second delivery mode. The second delivery mode uses a second number of retries different from the first number of retries. In some implementations, the second type of encoded video data is delta video frames (e.g., P frames, B frames, and/or other types of delta video frames). In some implementations, the first number of retries is greater than the second number of retries, which provides increased reliability when transmitting using the first delivery mode in comparison to the second delivery mode.

In some implementations, the example method 1000 also determines whether any streaming clients have fallen behind in the media stream and selectively drops portions of video data when needed (e.g., based on scalability information and/or LTR frame information). For example, the example method 1000 can also perform some or all of the operations described for the example method 900.

In some implementations, the example method 1000 uses different delivery modes for delivering encoded audio content (e.g., in addition to delivering encoded video content). For example, different delivery modes can be used to provide different levels of reliability (e.g., by adjusting FEC reliability levels of the audio data to be streamed to the streaming clients). The example method 1000 can also selectively drops audio content (e.g., in addition to selectively dropping video content). For example, when a streaming client has fallen behind (e.g., based on monitoring a buffer indicating encoded audio content to be delivered to the streaming client), audio content (e.g., redundant audio content) that would otherwise be streamed to the streaming client can be dropped (not transmitted to the streaming client). In some implementations, the selective dropping for audio content is performed by adjusting an FEC reliability level of audio data to be streamed to the streaming client.

Example 11—Example Media Block Format Supporting Client-Side Interleaving and Peer-to-Peer Distribution The present disclosure provides packaging formats, referred to as blocks (having block types), that can be used with described streaming techniques. As described, disclosed streaming techniques can operate by sending track setup information to a client, which can be in a format or protocol other than a protocol used for delivering streaming content to a client. For example, the track setup information can be provided via HTTP, including in response to a client HTTP request. In other scenarios, the track setup information can be sent using the same protocol used to provide streaming media blocks, but in a block that is different than a block that contains a media sample (as referred to earlier, for example, a frame of audio or video). So, consistent with the previous discussion, disclosed techniques can provide a client with information useable to participate in media streaming, but using a "push" protocol where the client is sent media samples in media blocks without issuing a request to a streaming server.

Figure 11:
FIG. 11 provides a diagram illustrating an example block format for use in disclosed techniques, as well as different block types that can be represented in the example block format.

FIG. 11 illustrates a general block structure 1104 that can be used in disclosed techniques. A given block can include a block type identifier 1108, followed by one or more property identifiers 1112 (shown as properties 1112*a*, 1112*b*) and their corresponding property values (1114*a*, 1114*b*). The block can then include a payload 1118. The properties 1112 and the nature of the payload 1118 can differ between different block types.

Discloses streaming protocols can include all of block types described herein, can omit certain block types, or can include block types in addition to those shown in FIG. 11, or can include one or more of the block types shown in FIG. 11, but the blocks can be implemented in a different manner than shown and described. Having the block type identifiers 1108 and the property identifiers 1112 can be useful, including for providing backwards compatibility or cross compatibility. For example, a streaming client can simply ignore block types and property types it is not programmed to recognize.

In some implementations, media streaming provides different types of content, and a streaming client can be provided with one or more content streams. In particular, disclosed techniques provide for separate streaming of audio samples, video samples, or text samples. As shown in FIG. 11, a table 1130 lists various types of block types that can be used in disclosed techniques, where a column 1134 lists the different block types and a column 1138 contains a description of a block type.

Rows 1142*a*-1142*c* provide track setup blocks for, respectively, audio tracks, video tracks, and text tracks. As described, the setup tracks can be used by a client at the start of a streaming session, where the client thereafter automatically receives appropriate blocks providing samples of a given track type. As shown in the common description of cell 1146 for the rows 1142*a*-1142*c*, track setup information can include information useable to initialize a media codec for a given track type, including information specifying relevant codecs to be used. Audio and video tracks can include information such as bitrate and resolution, while setup information for a text track can include a human readable (textual) annotation. Text track setup information can include an encoding scheme used for the text.

Rows 1142*d*-1142*f* relate to blocks that contain actual media samples, which are the primary block types used during streaming. As noted in cell 1148, the sample blocks can contain unencrypted or encrypted media samples. When a stream includes multiple media sample types, different connections between a provider and a streaming client can be used for the different media types, or multiple media types can be multiplexed over the same connection. In addition, a streaming client can received the same or different media types from different providers, which can be other streaming clients or one or more primary provider nodes.

Another block type, represented by row 1142g, provides decryption key information, in particular mapping a local encryption key ID to a GUID for the encryption key. This block type can be useful for key rotation for sample encryption/decryption, where the same local key ID is used, but can be mapped to different encryption key GUIDs.

Row 1142h provides a block type for a stream message. As noted for the corresponding entry in column 1138, stream messages can be arbitrary strings, including strings providing messages related to the status of a stream, including an identification of alternative streaming sources. In some cases, the streaming client can use the contents of a stream message for obtaining new/updated track setup information. Stream messages can also be used to provide information regarding connection quality, such as a provider node providing information about its perceived connection for quality for potential use by streaming clients, or downstream provider nodes (which can also be streaming clients). In peer-to-peer implementations using disclosed techniques, which will be further described, the stream message can be used for purposes such as distributing hash keys or for providing information about nodes within a cluster, including which nodes serve as seeders.

Row 1142i relates to a publish file message, while row 1142j relates to a delete message file. As indicated in the cell 1150, these block types can be used when the described protocol is used to transport files, such as files for the HLS or DASH protocols. That is, the block types can be used as commands to publish or delete particular blocks, or chunks. In the case where file-based content is provided by multiple providers, a stream source identifier can be included in a message, which can be a monotonically increasing number, where the number is incremented for each new stream source.

A publish file block 1142i can include a file having media content, such as an HLS or DASH file, while the delete file block 1142j can be used to indicate that a file is no longer in use. File deletion can be useful for, among other things, cache management.

In particular examples, file-based streams can be used with the disclosed block formats rather than, or in addition to, sending media samples of the media sample block type (rows 1142d-1142f). This can be useful when a livestream is already being converted to HLS or DASH chunks. Although the media content blocks are not chunk-based instead of sample-based, they can still be delivered in a "push" mode, as opposed to having additional chunks being requested by a streaming client.

As an example of how disclosed techniques can be used with disclosed block formats, a media source can provide encoded samples, and media segments, playlists, and manifests can be created therefrom. The files corresponding to the media samples can be a payload of a disclosed block format, such as for transmission between intermediate server nodes in a cloud environment. In some cases, these blocks are provided to a content delivery network for delivery to streaming clients.

A latency trace block type is provided in row 1142k. As previously described, and as will be further discussed, a streaming client can receive blocks through multiple sources, such as through one or more client delivery nodes, where one or more of the client nodes obtain the blocks from a primary delivery node. In addition, streaming clients can receive blocks for a given stream through multiple pathways, which can have varying degrees of indirection. As described in column 1108, the latency trace block can include "coordinates," such as node identifiers, for transmission points in a pathway, along with timestamps associated with processing a block by a transmission point. This information can allow transport latency to be estimated, which can enable a streaming client to switch, add, or delete stream providers. In one implementation, whenever a given latency trace block is processed by a node, the node adds its coordinates (identifier) to the list of coordinates, along with a timestamp.

An end of stream block type of row 1142l indicates the end of a stream, which can allow a streaming client to perform session termination operations, such as stream termination, stream cleanup, and resource release. Where the disclosed block format is used for file-based streaming, an end of stream block type can be used to indicate that final playlists should be generated and published.

FIG. 12 provides a table 1200 providing additional information that can be included in a media sample block, such as the media sample blocks 1142d-1142f of the table 1130 of FIG. 11. For example, the information in the table 1200 can correspond to properties 1112 of the block format 1104. The table 1200 includes a column 1202 indicating a position of the property in the block header information, a column 1204 identifying a particular property 1112, and a column 1206 providing a description of the respective property.

In row 1212a, a first property of the set of metadata properties represented in the table 1200 provides a track identifier 1204a. A track identifier 1204a can be used in multiplexing individual streams to provide an overall/composite stream. For example, a particular overall stream can be associated with an audio track and a video track, which are separated streams that are multiplexed during playback. In some cases, identifiers for specific tracks are provided in a request to join a streaming session, and track setup information can be provided for those streams.

Row 1212b provide a timestamp property 1204b for the sample in the block, which in some cases can be measured in microseconds (particular when samples correspond to individual frames of a video stream, or corresponding audio or textual content for a video frame). The values of the timestamp property 1204b can be used for track synchronization, so that buffering results in identical delays for all stream tracks.

Rows 1212c and 1212d can be used for encryption-related information. In particularly, the key ID property 1204c indicates what encryption key should be used by a streaming client. A seed can be provided as a value for a property 1204d, which can be used to restore an initialization vector for an encrypted sample. In some cases, a seed can be provided in an initial block, and new seeds can subsequently be provided as part of key rotation.

FIG. 13 provides a table 1300 that includes example content for a media sample block type, in particular a block type for an audio sample. Similar types of information can be included for other types of media samples.

The table 1300 includes a column 1304 identifying a position in a block for particular content identified in column 1308. A datatype for the content is provided in column 1312, while a description for the content is provided in column 1316.

The table 1300 is shown with rows 1320a-1320f. Row 1320a provides information for a block size 1308a for the audio sample block (such as measured using the Vint datatype). The block size content 1308 can include the size of the media sample itself, as well as metadata/header information for the block and any padding data, as will be further described.

Row 1320b provides information for an object type 1308b for the block, which can correspond to a block type of the table 1100 of FIG. 11. For example, the object type 1308b can have a value of 1, indicating an audio sample type, or a value of 2, indicating a video sample type. Other values can indicate text media samples, or other media type as might be used in various streaming applications.

As noted in the comment column 1316 for the row 1320b, the object types 1308b can be used by a media player for various purposes, such as synchronizing different sample streams (for example, synchronizing audio and video blocks for a composite stream). The media player can be configured to ignore block types that it does not recognize. For example, assume that a media player is programmed to combine audio and video blocks for playback, but is not programmed to recognize an object type value for text content. In this case, the media player can simply ignore blocks for the text content. However, a different or updated media player can be programmed to recognize blocks having the text content type, and to synchronize those blocks with blocks for audio and video samples.

Rows 1320c-1330f represent particular properties of a media sample, such as properties 1112 of the block format 1104. Each property can include a property descriptor and a property value. The value can be a binary value or integer value, although other types of values can also be used. In some cases, a hexadecimal type representation can be used, where the left nibble provides a property descriptor/type (having a value 0-F), and the right nibble indicates a payload type (having a value 0-F). For instance, a property descriptor can have a value of 0×40, wherein 4 indicates a property type and where 0 indicates a datatype used to express values for the property.

Row 1320c, corresponds to a payload size override property, which can have the property descriptor of 0×10, where 1 indicates the override type and where 0 indicates that the payload type is a VInt. The value of the property, expressed as a VInt value, can follow the property descriptor. Having a payload size override value can be useful, for example, when encryption schemes use fixed encryption block sizes, and a payload is less than this size. That is, the sample can be padded with data to meet the encryption block size, and the payload size override can be used to determine the size of the actual payload (corresponding to the media sample).

As well be further described, disclosed techniques can facilitate operations during media playback, or in some cases, for operations at a provider node (such a primary provider node or a client provider node). For example, a component of a computing system (node) can include functionality to rearrange blocks containing media samples, or the samples themselves, to drop/ignore duplicate blocks/samples, to reorder blocks/samples, or to compensate for missing content/samples. Media blocks, including audio sample blocks, can include a property 1308d, of row 1320d, whose values can be used to sequence blocks (and their associated samples). This property 1308d can be referred to as a recovery index. In a specific example, the property recovery index has a property descriptor of 0×20, where 2 indicates that the property is the property recovery index and 0 indicates that the payload for the property is expressed as VInt values.

The actual value can represent a sequence value for the particular media track, which, depending on implementation, can be specific to the particular media track or can correspond to a sequence used for one or more media types, such as for an overall media stream. For example, audio samples may have a higher sample rate than video samples, and so the sequence for a particular audio sample may not have the same sequence number in a stream as a sample in the video stream, even if the audio is to be synchronized with a particular video sample.

The recovery index property 1308d can serve a complimentary purpose as the timestamp of row 1212b of the table 1200 of FIG. 12. That is, the timestamp, corresponding to a presentation time, can be used to synchronize samples for playback, while the recovery index property 1308d can be used for more "transport"-related issues, including ordering sample blocks, dropping sample blocks, or identifying missing sample blocks.

One advantage of the sequence numbers provided by the recovery index property 1308d is that they can quickly be determined from the block metadata, and directly analyzed for sequencing, duplicate detection, etc. For example, a sequence can be directly determined without having to subtract a timestamp for a sample in the block from a reference timestamp.

It should be noted that the recovery index property 1308d is different from other sequence numbers that might be used. In particular, the sequence number of the property 1308d is different than sequence numbers that might be associated with packets, such as TCP packets, are used for transmitting the blocks. A block can be split into multiple TCP packets and transmitted, where the packets can have numbers that are used to manage transmission, including reassembling to packets to provide a block. A separate sequence number is used for the block, available after the block is reassembled after transmission is complete and is used to manage blocks as blocks, as opposed to managing/sequencing samples with blocks.

Note that the sequence identifier of the property 1308 is used even when reliable transport protocols are used, not for ordering of packets use lossy or semi-lossy protocols. Further, note that ordering is performed using sequence numbers, not information such as timestamps or based on information about media samples, such as the nature of video frames (such as ordering frames depending on whether they are I frames, p frames, reference frames, etc.).

Row 1312e corresponds to a wall clock property 1308e, which can have a descriptor of 0×40, where "4" identifies the property as the wall clock property and "0" again indicates that the value of the wall clock property is provided in the VInt data type. In this case, the wall clock value corresponds to the point a sample was ingested into a delivery pipeline. The wall clock value can be compared with a presentation time at a playback component (the time at which a sample is intended to be played back at the streaming client) to determine media delivery latency.

That is, latency can be determined in multiple ways. In one way, the wall clock value of row 1312e can be subtracted from a real time clock value at a playback component of a streaming client, where the result indicates media delivery latency. In another way, an offset value for the streaming client can be calculated by adding the presentation time (offset value from the start of streaming at the streaming source) to a real time clock value recorded by the streaming client at the beginning of playback. This value can be subtracted from the current real time clock value to provide another measure of media delivery latency.

In some cases, one technique or multiple techniques for calculating media delivery latency can be used. For example, the wall clock value of the row 1312e can be sent periodically, such as one every few second, to allow for higher precision latency measurements, and in the interim the presentation time can be used. In further examples, only one of the techniques is used, but values are not provided in every block. For example, a wall clock value can be provided once every several seconds, while intervening blocks omit this property.

In this regard, note that the format described with respect to the table 1300 can allow for the use of properties to be optional. If a streaming client does not recognize a property, that property can simply be ignored. Similarly, the streaming client can include logic that recognizes that certain properties are optional or only periodically provided. For example, even when a streaming client is configured to use the wall clock value of the row 1312e for media latency calculations, the streaming client is configured to process blocks when a value for this property, but omitting a media latency calculation or performing such a calculation using a different technique when a wall clock value is not provided.

Row 1312f of the table 1300 provide information regarding a media data property. The media data property can have a descriptor of 0×30, where "3" indicates a media data property and "0" indicates values provide in the VInt data type. In a particular embodiment, the media data property includes the property description, a series of metadata values represented as VInt values, and a series of bytes corresponding to the media sample, up until the end of the block. The property descriptions and values can correspond to those provided in the table 1200 of FIG. 12.

In particular, the different metadata values can include a VInt value providing a track ID, which identifies what media stream a given sample is associated with. Another VInt value can provide the presentation sample timestamp, such as in microseconds. An encryption key identifier is provided in another VInt value. In some cases, a single key can be used to decrypt all individual streams in a composite stream for a particular streaming source. An IV seed can be provided in another VInt value. The key ID and IV seed can be set to zero for unencrypted samples.

In some cases, it can be useful to separately encrypt media metadata and media data, and thus it can be useful to have the encryption information for the media track and the encryption information for the media data. For example, it may be useful to access track metadata to determine whether a particular block should be used, where the media data is later decrypted if the media samples in the block are to be processed for playback.

The streaming format described in conjunction FIGS. 11-13 can provide a variety of advantages. By delivering samples, as opposed to files, as in protocols like HLS or DASH, disclosed techniques do not add additional latency beyond that needed for the underlying codecs. That is, the block format does not require the parsing of chunks. Further, a more limited amount of metadata is needed, since metadata required for stream rendering can be provided at track/stream setup, and does not need to be included in subsequent blocks, particularly subsequent media sample blocks, which are expected to be the primary block types used after the initiation of streaming. Media sample blocks can simply indicate the particular type of sample stream to which they belong, such as for use in multiplexing or interleaving.

A previously noted, disclosed techniques can operate on a "push" basis, as opposed to a request/response model used in techniques such as HLS or DASH. The push nature of communications can both reduce latency and network traffic-saving computing resources both in terms of processing (since no requests need to be generated or processed) and network resource (since requests are not sent).

Further, a given stream can be easily forked at a particular node, either as part of converting a client node to a provider node, or adding another streaming client to a node already serving as a provider node (which can include a streaming client acting as a delivery node, including in peer-to-peer implementations). In some cases, such as for text for least certain types of audio or text samples, forking can be initiated at any sample block. In the case of video samples, a particular type of sample, such as a key frame, may be needed before forking can occur, but these frames occur regularly, so little forking delay is introduced.

The block format supports end-to-end encryption, including with key rotation, where encryption can be applied at multiple levels. Blocks that provide stream messages allow or changes to be made during streaming, such as a change in stream resolution, where new setup information can be provided to allow codecs to be re-initialized for updated stream parameters.

Disclosed techniques can support fixed or variable sample rates, such as for audio or video. However, in some cases fixed sample rates can be assumed, which can help in optimizing bandwidth usage.

Example 12—Example Peer-to-Peer Media Streaming

Disclosed techniques also support peer-to-peer delivery of content using a sample-based, as opposed to a chunk-based approach, where clients receive samples through a "push" based protocol, rather than a request/response protocol such as HLS or DASH, including as used with Enterprise Content Delivery Networks (EDCNs). That is, while EDCNs can provide a peer-to-peer implementation of HLS or DASH, the protocol still uses a request/response implementation, which can suffer from the disadvantages noted above.

Another advantage of disclosed block formats is that they are "read to fork" for being served to one or more streaming clients. That is, the block format includes media samples, and, as opposed to file-based protocols like HLS or DASH, no "chunk" processing is needed before blocks can be forwarded. Moreover, metadata, as opposed as opposed to being sent in every block (as in HLS and DASH), which needs to be updated prior to forwarding a chunk, is typically sent only upon stream initiation. This makes forking a simpler process, in additional to reducing latency. However, new metadata can be sent upon the occurrence of specific events, such as when streaming has been restarted, for example, when stream resolution has changed. The new metadata can be used to re-initialize codes at a streaming client.

When a peer-to-peer implementation is used for a specific stream, all streaming clients can participate in the peer-to-peer network, as seeders or leaches, or some streaming clients can receive content in another manner, such as directly from a primary delivery node or from a client node, such as described with respect to FIG. 1.

Figure 14:
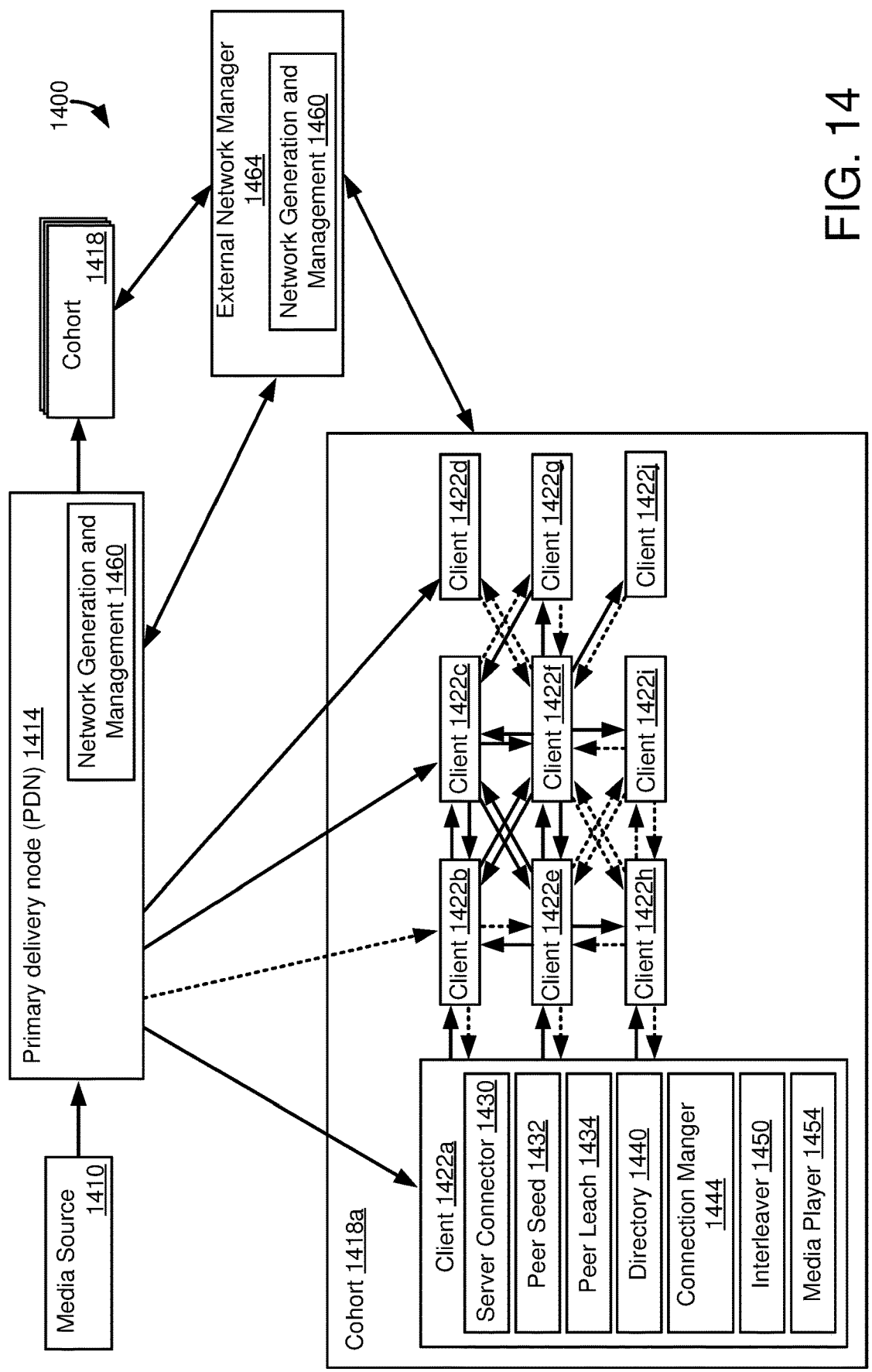
FIG. 14 is a diagram of an example peer-to-peer network for distributing blocks having the example block format of FIG. 1.

FIG. 14 illustrates an example peer-to-peer computing environment 1400 in which disclosed techniques can be implemented. The computing environment 1400 can include a media source 1410 and a primary delivery node 1414, which can correspond to the media source 110 and the primary delivery node 120 of FIG. 1. The primary delivery node 1414 is in communication with one of more cohorts 1418. A given cohort, such as the cohort 1418a, include a plurality of streaming clients 1422 (shown as streaming clients 1422a-1422j). Technically, the primary delivery node 1414 communicates with one or more of the streaming clients in 1422 in a cohort 1418.

The cohort 1418a illustrates components for an example streaming client 1422a, which can be representative of the steaming clients 1422. In a particular implementation, the streaming client 1422a can communicate with a server (such as the primary delivery node 1414) as well as with other streaming clients 1422. At various times a given client 1422 can serve as a seeder or as a leach. As used herein, a seeder refers to a streaming client 1422 that sends streaming blocks to other streaming clients. A leech refers to a streaming client 1422 that only receives streaming blocks from other streaming clients. A given streaming client 1422 can concurrently serve as a seeder and a leech, but would still be termed as a seeder. That is, the streaming client 1422 provides blocks to other streaming clients but, absent a direct connection to the primary delivery node 1414, the streaming client also receives blocks from other streaming clients.

The client 1422a is shown as including a server connector 1430, a peer seed component 1432, and a peer leach component 1434. The server connector 1430, the peer seed component 1432, and the peer leach component 1434 can communicate with other components (the primary delivery node 1414 or other streaming clients 1422) using the same network protocol or using different network protocols. Further, these components may be able to communicate using a variety of protocols, and a particular protocol can be used for a particular connection. In particular examples, communication between a streaming client 1422 and the primary delivery node 1414, such as using the server connector 1430, occurs using HTTP long poll, TCP, UDP, QUIC (Quick UDP Internet Connections), SRT (Secure Reliable Transport), or RTMP (Real-Time Messaging Protocol), or gRPC (gRPC Remote Procedure Call). Communications between the streaming clients can use protocols such as TCP, UDP, webRTC (Web Real-Time Communication) data channel, QUIC, SRT, RTP (Real-Time Transport Protocol), WebSocket, or BitTorrent.

The server connector 1430 is used by the streaming clients to connect to the primary delivery node 1414, which can occur as described elsewhere in this disclosure, including as described with respect to FIGS. 1 and 2. The peer seed component 1432 includes functionality to form a content stream to provide content to multiple peers, where the forking capability can be implemented as described with respect to FIG. 6, and Examples 5 and 6. More particularly, the peer seed component 1432 can include logical buffers to various receivers, or can have a single buffer with pointers to the buffer being maintained for each receiver. The peer seed component 1432 can also perform operations, such as dropping blocks, when a receiver has been determined to have fallen too far behind in block delivery.

The peer leach component 1434 is configured to connect with and receive blocks for the same media stream from multiple streaming clients 1422. The peer leach component 1434, as well as the peer seed component 1432, can access a directory 1440 that includes information about available peers for a particular stream. The directory 1440 can be implemented as in other peer-to-peer protocols, including as at least a portion of distributed hash table of streaming clients 1422 in a cohort 1448. The directory 1440 can also include, or that streaming client 1422a can otherwise include, a routing table. In a specific implementation, the routing table provides an identifier for a "next hop" streaming client for a particular target client in the directory 1440.

A connection manager 1444 can be used by the peer leach component 1434 to manage connections to other clients. For example, the connection manager 1444 can perform operations such as identifying new streaming clients 1422 that are available to seed a particular stream, to prioritize certain seed streaming clients 1422, or to drop connections with streaming clients. For example, a seed streaming client 1422 that serves as a seeder can be dropped if the time between blocks exceeds a threshold (or certain blocks are not received from the seed streaming client), or if an aggregated latency metric (such as an average latency over a period of time) for the seed streaming client exceeds a threshold.

Compared with the computing environment 100 of FIG. 1, an advantage of disclosed peer-to-peer network implementations is not just that a single streaming client 1422 can receive a data stream from multiple streaming clients, and where such sources/connections can change over time, but that a given streaming client 1422 can concurrently receive streaming data from multiple streaming clients. The streaming client 1422a is shown as including an interleaver component 1450. The interleaver component 1450 is responsible for assembling a stream of blocks that can be provided to, and used by, a media player 1454 (such as a web browser or other type of streaming client) for stream playback. Operations performed by the interleaver component 1450 can include ordering blocks received from one or more clients into a sequential stream, such as using the recovery index values of the property 1308d of table 1300 of FIG. 13.

The interleaver component 1450 can include a buffer where blocks are held for a period of time so that an ordered sequence of blocks can be provided to the media player. For example, assume blocks having sequence numbers of 3, 4, and 6 are received. The interleaver component 1450 can maintain blocks 3, 4, and 6 in a buffer for a period of time until block 5 is received. The interleaver component 1450 can then place the blocks in the correct order and provide them to the media player 1454. Note that the buffer (shown as buffer 1510 in FIG. 15) is different than a buffer used as part of a transmission protocol, such as TCP, as the buffer contains assembled blocks after delivery is complete, not particular packets of a single block.

The interleaver component 1450, or another component of the streaming client 1422a, can take various actions when a block is not received within a threshold period of time. These actions can include dropping a particular playback time or dropping a particular sample type from the playback time. For example, assume that, for a particular playback time, an audio sample has been received but the corresponding video sample has not been received. The media player 1454 can be provided with a sample stream that includes the audio sample only. The interleaver component 1450, or other component, can also perform actions such as duplicating samples. In the example above, assume audio samples 3-6 have been received, but only audio samples 3, 4, and 6 have been received. In one implementation, the interleaver component 1450 can send to the media player 1454 the ordered audio samples and the correspondingly ordered video samples, but video sample 4 is duplicated to compensate for the lack of video sample 5.

If there is a disruption to a connection to one or more seeding streaming clients 1422, the leech/receiving streaming client 1422 can revert to a connection with the primary delivery node 1414, such as using the sever connector 1430. If suitable number of connections, which can include a single connection, to a streaming client 1422, serving as a seeder, are established, the streaming client 1422a can return to receiving blocks through the peer leach component 1436.

An overlay network, at least initially, can be generated by a network generation and management component 1460 of the primary delivery node. The network generation and management component 1460 can perform actions such as, at least initially, forming cohorts 1418 from streaming clients 1422, such as using information such as physical or network locality, or based on connection speed or reliability. The overlay network can also include an initial set of routing tables to be used by streaming clients 1422, or distributing keys of a distributed hash table amongst the streaming clients.

Depending on a level of centralized supervision desired, the network generation and management component 1460 can also be responsible for actions such as adding streaming clients to, or removing them from, a cohort. The network generation and management component 1460 can also perform actions such as updating routing tables or hash keys are the streaming clients 422. In other scenarios, at least some of these actions can be performed directly by the streaming clients 1422.

In some cases, it may be useful to leverage functionality of an existing, or otherwise external, peer-to-peer network manager 1464, which can include the network generation and management component 1460. Using an existing or external peer-to-peer network manager 1464 can avoid replicating functionality on the primary delivery node 1414. It can also be useful in reducing the computing or networking load on the primary delivery node 1414.

FIG. 14 illustrates various types of connections between streaming clients 1422 and other streaming clients, or between streaming clients and the primary delivery node 1414. Arrows between streaming clients 1422, and between streaming clients and the primary delivery node 1414, represent possible communication connections. Dashed leads indicate inactive connections, while solid leads indicate active connections. In the case of streaming clients 1422, solid leads thus indicate that a streaming client is acting as a seeder, while a dashed connection indicates that a streaming client is acting as a leach. The connections shown are dynamic, as, as explained above, streaming clients 1422 can switch between seeder and leach status. Similarly, in some cases streaming clients 1422 can have a connection with the primary delivery node 1414, which can be a connection that introduces blocks in the cohort as part of "normal" operation, or such a connection can be established when a streaming client 1422 is not able to connect with a peer streaming client 1422. In this "normal" operation, a streaming client 1422 with a connection to the primary delivery node 1414 can serve as a seed to other streaming clients, but can also act as a leach. For example, in some cases, content might be received from a peer streaming client 1422 before being received from the primary delivery node. Or, a streaming client 1422 can have a connection to the primary delivery node 1414 for one media type, but can receive blocks for other media types from other streaming clients.

More specifically, in FIG. 14, streaming clients 1422a, 1422b, 1422c, 1422e, 1422f, and 1422g act as seeds, as they have outgoing solid arrows. Streaming clients 1422h, 1422i, and 1422j act as leaches, since they have no active outgoing connections. Streaming client 1422d represents a scenario where a streaming client 1422 is not in communication with other streaming clients in a peer-to-peer manner, and so has established a fallback connection directly to the primary delivery node 1414.

Note that a streaming client 1422 can have one or more of the components shown for the streaming client 1422a, even if disclosed techniques are not implemented in a peer-to-peer environment. For example, a streaming client can omit the peer seed component 1432 and the peer leach component 1434, or such components can be included but not be active.

Example 13—Example Interleaver Operations

Figure 15:
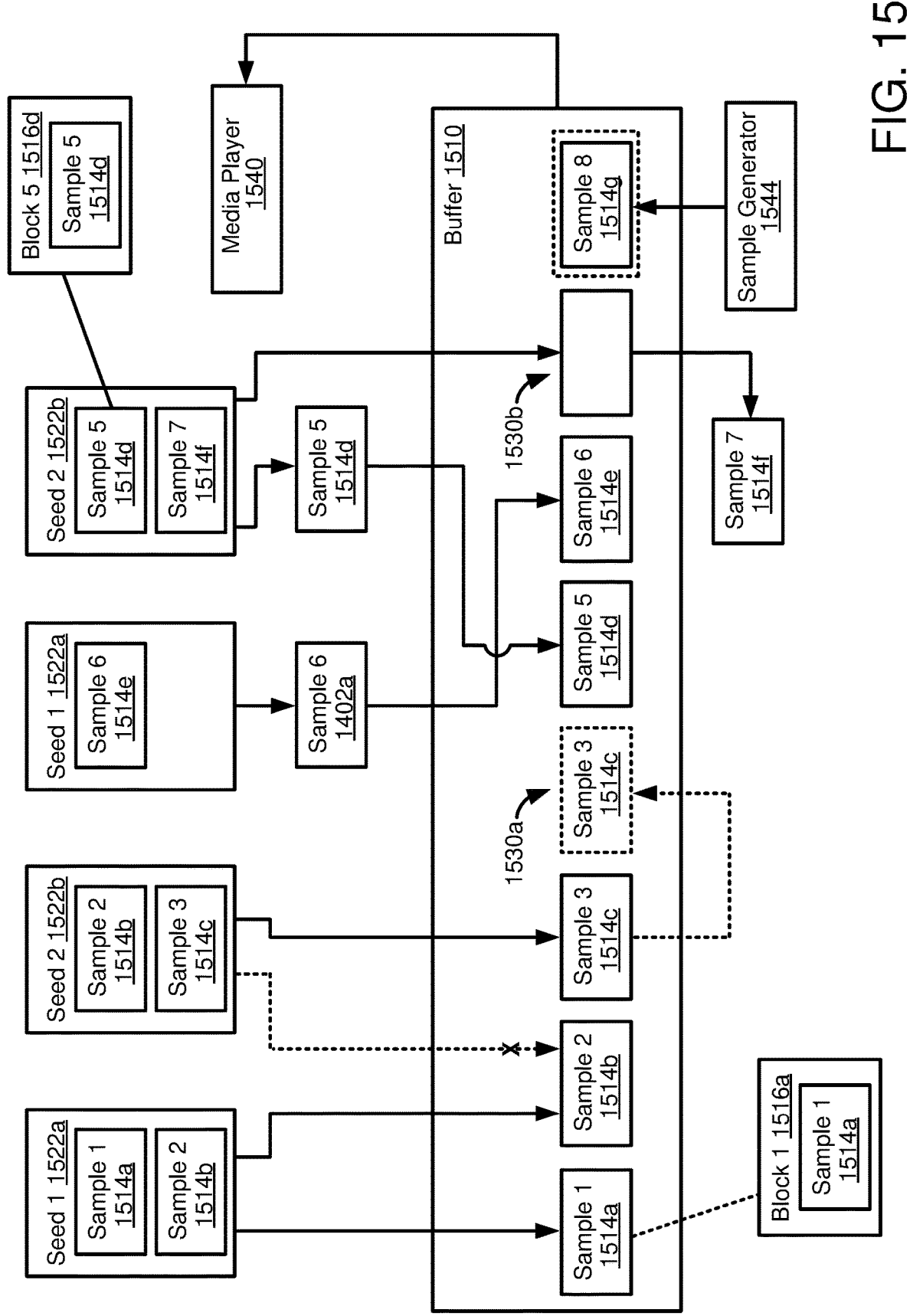
FIG. 15 is a diagram illustrating operations performable by an interleaver component of a streaming client, include sample rearrangement, duplicate sample rejection, and compensation for missing samples.

FIG. 15 illustrates operations that can be performed by the interleaver component 1450 of FIG. 14. In particular, FIG. 15 illustrates how an interleaver can be responsible for ordering samples and for dealing with missing samples or duplicate samples. It should be noted that FIG. 15 can represent simplified operations for the interleaver component 1450. That is, the functionality in FIG. 15 is described with respect to a single type of media content. However, the interleaver component 1450 can also be responsible for interleaving different types of media content. For example, the interleaver can be responsible for creating stream of samples that are output to a media player, where the samples are of different media types, such as having a mixed stream of audio samples and video samples. Functionality with respect to handling of different types of media samples is described with respect to FIG. 16.

Turning to FIG. 15, the interleaver component 1450 can maintain a buffer 1510 that can be used to temporarily store media samples 1514 (shown as media samples 1514a-1514g). For purposes of FIG. 15, it is assumed that the media samples 1514 are all of the same type, such as being audio samples or media samples. The illustration of media samples 1514 can be a simplification, where the buffer 1510 stores blocks, where the blocks include the recovery index value (sequence identifiers) described with respect to FIG. 13, and the samples/blocks are ordered and processed/manipulated using such values. As an example, sample 1514a is also shown with its corresponding block 1516a, and sample 1514d is shown with its corresponding block 1516d.

In the example scenario of FIG. 15, the interleaver component 1450 of a particular streaming client 1422 of FIG. 14 receives media samples 1514 (in correspond blocks, such as blocks 1516a and 1516d) from multiple providers, including a first seeder 1522a and a second seeder 1522b. The interleaver component 1450 assembles a coherent stream from these media samples 1514. For example, the interleaver component 1450 can place samples in the buffer 1510 without regard to from which seed streaming client 1422 the samples are received—the first sample received is buffered. Although shown as including two seeders 1522a, 1522b, a given streaming client can receive blocks from more than two seeders, can receive blocks from one or more seeders and one or more connections to a primary delivery node, can receive blocks from one seeder and one or more connections to a primary delivery node, or can receive blocks from multiple connections to a primary delivery node and not from a streaming client. The scenario of FIG. 15 can represent a peer-to-peer delivery scenario, such as described with respect to FIG. 14.

In the example scenario, a first sample 1514a and a second sample 1514b are first received from the first seeder 1514a, and placed, in sequential order, in the buffer 1510 (such as based on wall clock or presentation time timestamps including in the respective blocks that include the samples 1514a, 1514b such as blocks having the format described with respect to FIGS. 11-13.

Now, assume that the interleaver 1450 receives a second block containing the second sample 1514b from the second seeder 1522b. Since the buffer 1510 already contains the second sample 1514b received from the first seeder 1522a, the interleaver 1450 ignores the additional copy of the second sample, and does not place it in the buffer 1510. If the second sample 1522b had been first received from the second seeder 1514b, the copy of the second sample received from the second seeder would be placed in the buffer 1510, and the copy of the second sample received from the first seeder 1514a would be ignored.

A third sample 1514c is received from the second seeder 1522b and is placed in the buffer 1510 in the correct sequential order.

A functionality of the interleaver component 1540 can be to handle situations where samples are not received in within a specific time period. That is, there may be a limited time that samples 1514 can sit in the buffer 1510. If samples 1514 are not received in that time frame, the interleaver component 1540 can perform actions to account for missing samples, or can release samples (such as releasing the corresponding blocks containing such samples) from the buffer even though one or more samples in the sample sequence are missing.

In some cases, the interleaver component 1450 can duplicate a sample 1514 to account for a missing sample, such as using a sample generator 1544. In particular, FIG. 15 illustrates a situation where a fourth sample is not received. In this case, the immediately preceding sample, the third sample 1522c, is duplicated to provide a sample for the next sample position 1530a in the sequence. The exact sample or samples 1522 used to generate a sample to replace a missing sample for a sequence position 1530a can depend on the particular type of sample (such as whether the sample is an audio sample or a video sample), a specific implementation technique, and the contents of the buffer 1510. Taking video samples as an example, the missing sample can be replaced by a duplicate of the third sample 1514c, where the third sample can correspond to an I-frame, P-frame, or B-frame, provided that when the third sample is a P-frame or B-frame the frame's reference I-frame is available.

As another example of how missing samples can be handled, consider sequence position 1530b. If a sample for the position 1530b is not received, it can be left as an empty sequence position in the stream. In particular implementations, a media player 1540 that receives samples 1514 from the buffer 1510 includes functionality to compensate for missing samples. For example, for video samples, the media player 1540 can including error concealment algorithms, such as algorithms that estimate or interpolate missing frame, which can use neighboring samples 1514 in the process. For audio samples, a missing sample can be compensated for by inserting an audio sample that is silent. In other words, the sample stream contains a sample, which can satisfy an expected sample rate, but the audio sample is rendered as silence. Similar techniques can be used for video samples.

In scenarios, a sample can be omitted from a stream, even if the sample is in a correct order. For example, consider sample 1514f. Sample 1514f can represent a sample that depends on another sample, such as, for video samples, when the sample is a P-frame, which references an I-frame. If the buffer 1510 does not include the I-frame needed by the P-frame of sample 1514f, the sample 1514f can be omitted from the buffer/stream, and either a gap is left in the buffer or compensation techniques can be used to fill in the gap, such as described for the sample 1514c.

The buffer 1510 can have a fixed size or can have a variable size. In some cases, the buffer 1510 is initialized with a default size, such as 200 microseconds, but can grow depending on input conditions. However, typically, as discussed, samples 1514 are held in the buffer for a maximum time, after which one of the compensation techniques above can be used, or the sample stream can be provided to the media player 1540 with missing samples. Further, although compensation techniques for missing samples have been described as being performed by the interleaver component 1540, at least some of these techniques, such as compensating for missing samples, can be performed by the media player 1540.

Figure 16:
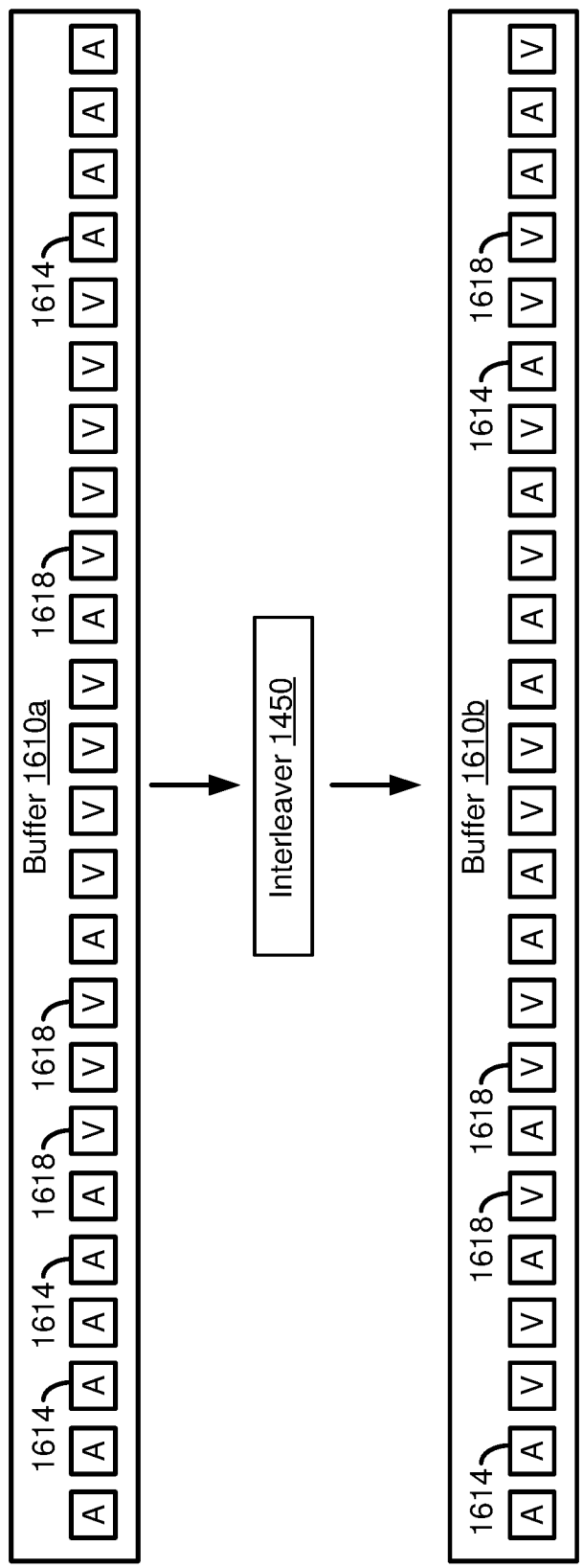
FIG. 16 is a diagram illustrating operations performable by an interleaver component of a streaming client, including rearranging media samples to avoid long runs of media samples of the same media sample type.

FIG. 16 illustrates additional functionality provided by the interleaver component 1450 of FIG. 14. That is, a media player, such as the media player 1454 of FIG. 14, may expect a stream of media of different types that does not include extensive runs of one type of media sample. For example, a media player that renders synchronized audio and video may expect the audio and video samples for a particular presentation time to be provided relatively close to one another in the stream. Given the sample-based nature (as opposed to being file-based) of disclosed block formats, samples can arrive in comparatively long runs of the same media type. This can be particularly pronounced in peer-to-peer implementations or implementations that otherwise have a streaming client receive blocks from multiple sources (provider nodes).

Accordingly, the interleaver component 1450 can manage a sample buffer to reorder media sample types (also referred to as "modalities") to more evenly disperse media sample types in a stream provided to a media player. FIG. 16 illustrates a sample buffer 1610a, showing an initial ordering of two types of media samples, and a sample buffer 1610b, which is the same buffer as 1610a, but after reordering of samples in the sample buffer by the interleaver component 1450. The buffers 1610a, 1610b can correspond to particular states of the buffer 1510 of FIG. 15. Although not shown, the samples in the buffers 1610a, 1610b can be included in respective blocks, as described with respect to FIG. 15.

The operations described for the interleaver component 1540 and the buffer 1510 can be combined with the operations described with respect to FIG. 16. That is, the interleaver component 1450 can, for a single buffer, concurrently perform operations such as reordering media samples based on a sequence for a given media sample type, removing duplicate media samples, or compensating for a gap in a stream of media samples, as well as reordering a stream of samples to more evenly distribute samples of different media types.

The buffers 1610a and 1610b are shown as including multiple audio samples 1614 and multiple video samples 1618. In the buffer 1610a, there are comparatively long sequences of only audio samples 1614 or comparatively long sequences of only video samples 1618. The interleaver component 1450 reorders at least a portion of the audio samples 1614 and video samples 1618 to provide the buffer state of the buffer 1610b, which has the sample types more evenly distributed.

Depending on implementation the interleaver component 1450 can impose a strict ordering of media sample types or can more flexibly order sample types. Strict ordering can include ensuring that every audio sample 1614 is followed by a video sample 1618, which is then followed by another audio sample. More relaxed ordering can involve the interleaver component 1450 ensuing that consecutive runs of a give media sample type do not exceed a threshold, but where such a run can be broken up into smaller runs of a media sample types, and where such smaller runs can optionally vary in length. Further, although shown as reordering audio and video samples, the interleaver component 1450 can reorder other or additional sample types. For example, in an overall stream that includes audio, video, and text samples, the interleaver component 1450 can reorder all of the sample types, when appropriate, to avoid long runs of a single sample type.

Example 14—Example Technical Advantages

As described, in general, disclosed techniques can provide for improve media streaming by reducing latency in media transmission. For example, sending media samples without a client request reduces delays associated with generating and processing requests. Further, because individual media samples are sent in disclosed techniques, playback can be initiated more quickly, and can be performed more smoothly (since any media gaps will be smaller). In addition, the use of individual samples allows for more interactivity by streaming clients, since there is a lower delay in rendering samples at the streaming client—input from a streaming client can be provided more quickly in response to a streamed sample.

These improvements are enabled, at least in part, through the use of a unique packaging format. The packaging format provides blocks for various media sample types, as well as block types for non-media sample content, such as system messages or encryption information. The use separate media block types can improve playback compared with file-based streaming techniques where multiple sample types are included in a single file. That is, if a file is dropped or delayed, all media content is dropped on delayed. When different media sample block types are used, one type of media content can be rendered even if another type of media content is dropped or delayed. For example, if a video sample is not available, an audio sample for the relevant presentation time can still be rendered at a streaming client.

The media block types are lightweight, in that metadata can be reduced by having separate block types for media track setup information. This information can only be sent at the start of playback, or upon specific events, and so the size of the transmission units can be reduced as compared to file-based techniques, and less processing is needed by streaming clients.

Media sample blocks are associated with a sequence ID for blocks of a particular media block type. The sequence ID can allow for individual media blocks in a stream of a particular media type to be ordered or reordered quickly, simply by examining header/metadata for the block, without extracting sample content from the block. A streaming client can include an interleaver component that can take a variety of actions based on the sequence IDs, such as reordering blocks when blocks are out of order, reordering blocks of different media types to avoid long runs of a single type of media sample, or for detecting duplicate blocks. Thus, disclosed techniques can provide for smoother, lower latency processing at a streaming client, providing improved media playback and facilitating greater interaction by streaming clients.

Peer-to-peer topologies are also enabled by the present disclosure. These topologies can provide for improved distribution of blocks, including blocks that contain media samples, to and among streaming clients. By having more sources available, blocks have more transmission paths, and may be delivered more quickly, and can reduce congestion as opposed to scenarios with a more limited number of predefined transmission paths. Further, peer-to-peer implementations can provide more reliable delivery, since multiple sources may be available for the same type of media blocks.

The disclosed block format supports these peer-to-peer topologies, such as by, as described above, allowing for reordering of blocks or allowing for detection of duplicate blocks.

Example 15—Example Operations

Figure 17:
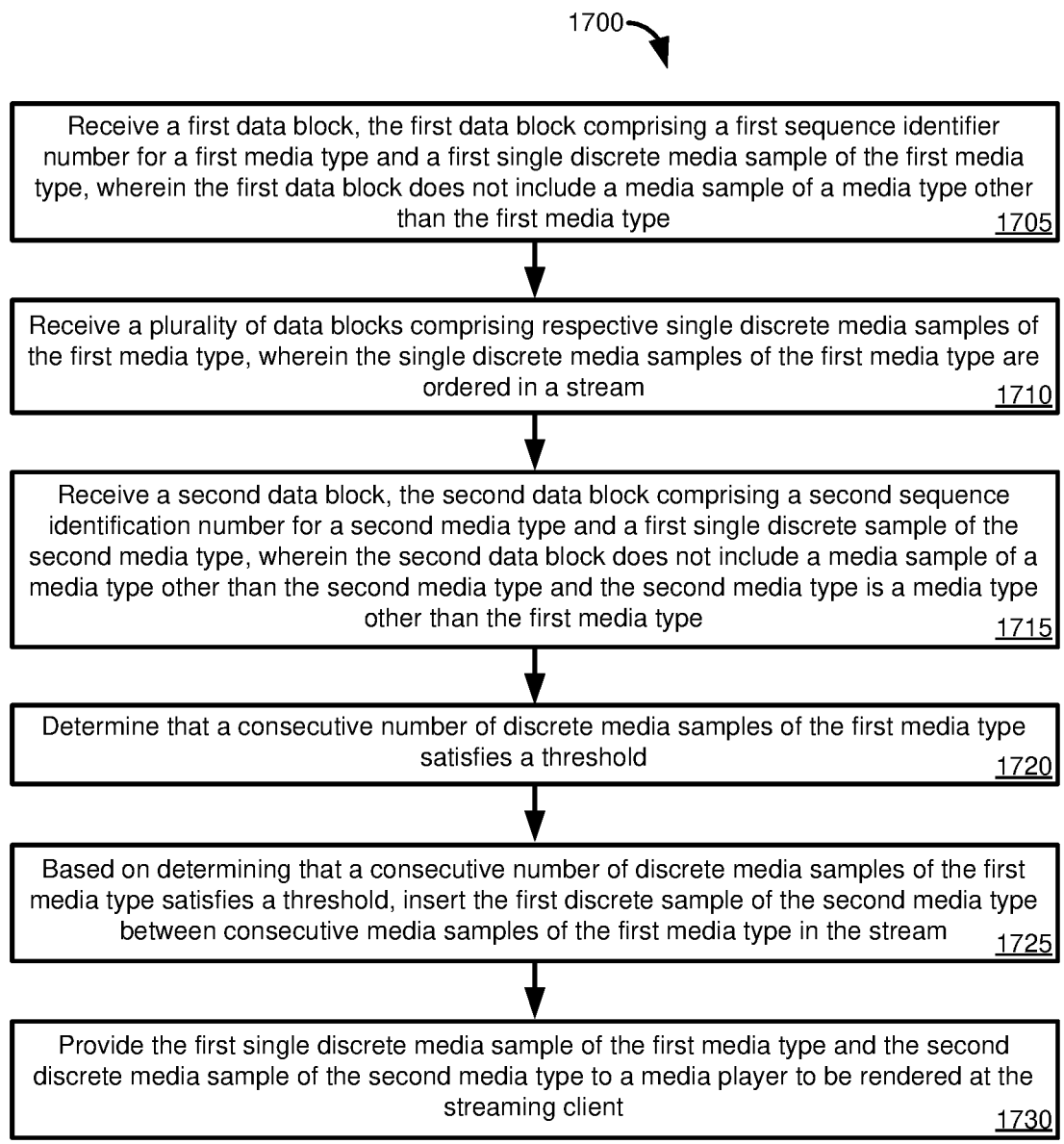
FIG. 17 is a flowchart of a process of performing processing operations at a streaming client with respect to blocks comprising media samples to facilitate low-latency media streaming by reducing consecutive runs of a particular media sample type.

FIG. 17 is a flowchart of a process 1700 of performing processing operations at a streaming client with respect to blocks comprising media samples to facilitate low-latency media streaming. A first data block is received at 1705. The first data block includes a first sequence identifier number for a first media type and a first single discrete media sample of the first media type. The first data block does not include a media sample of a media type other than the first media type.

At 1710, a plurality of data blocks are received that includes respective single discrete media samples of the first media type. The single discrete media samples of the first media type are ordered in a stream. A second data block is received at 1715. The second data block includes a second sequence identification number for a second media type and a first single discrete sample of the second media type. The second data block does not include a media sample of a media type other than the second media type. The second media type is a media type other than the first media type.

It is determined at 1720 that a consecutive number of discrete media samples of the first media type satisfies a threshold. Based on determining that a consecutive number of discrete media samples of the first media type satisfies a threshold, at 1725, the first discrete sample of the second media type is inserted between consecutive media samples of the first media type in the stream. At 1730, the first single discrete media sample of the first media type and the second discrete media sample of the second media type are provided to a media player to be rendered at the streaming client. The streaming client receives data blocks for a stream comprising the plurality of data blocks from multiple sources.

Figure 18:
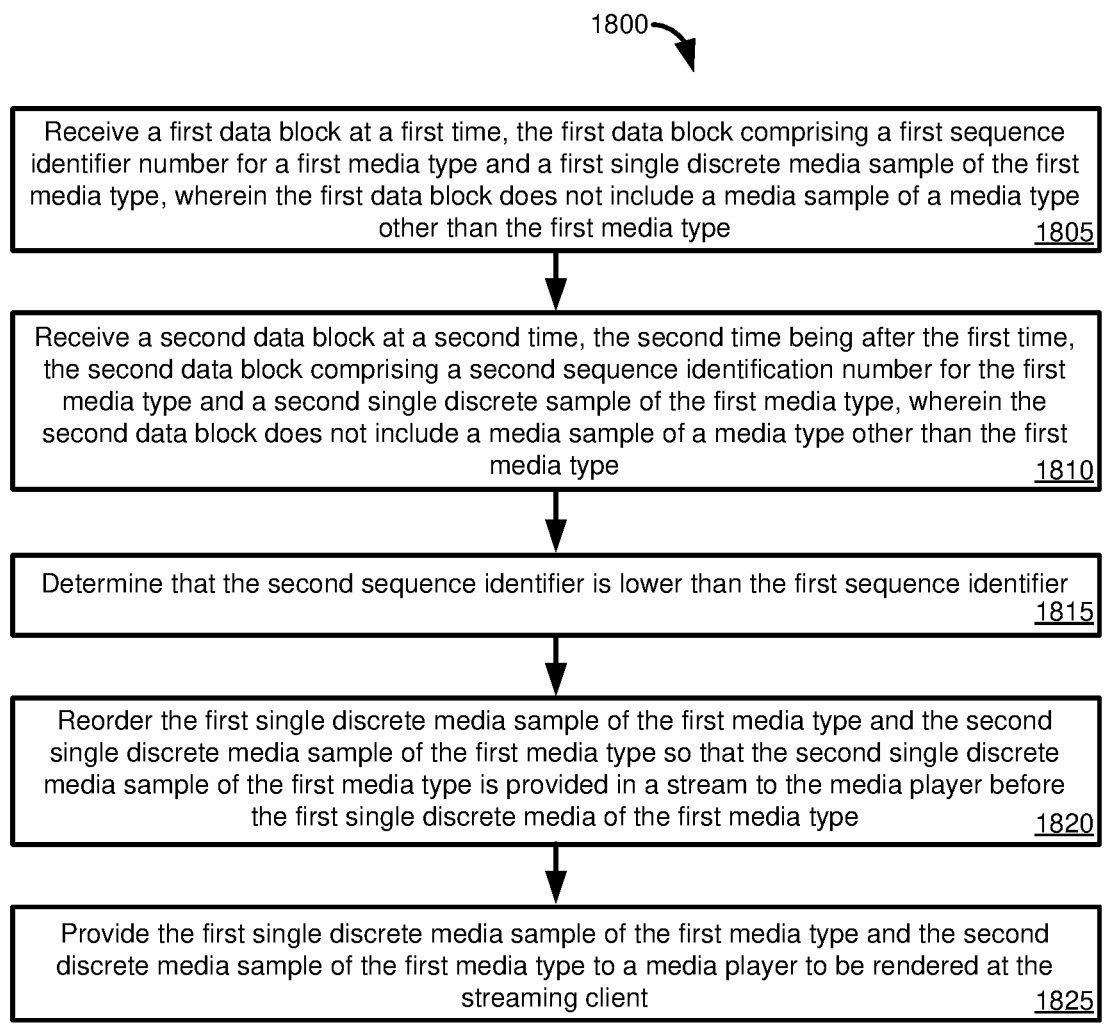
FIG. 18 is a flowchart of a process of performing processing operations at a streaming client with respect to blocks comprising media samples to facilitate low-latency media streaming by reordering media samples of a type.

FIG. 18 is a flowchart of a process 1800 of performing processing operations at a streaming client with respect to blocks comprising media samples to facilitate low-latency media streaming. The process 1800 includes, at 1805, receiving a first data block at a first time. The first data block includes a first sequence identifier number for a first media type and a first single discrete media sample of the first media type. The first data block does not include a media sample of a media type other than the first media type.

A second data block is received at a second time at 1810. The second time is after the first time. The second data block includes a second sequence identification number for the first media type and a second single discrete sample of the first media type. The second data block does not include a media sample of a media type other than the first media type.

At 1815, it is determined that the second sequence identifier is lower than the first sequence identifier. The first single discrete media sample of the first media type and the second single discrete media sample of the first media type are reordered at 1820 so that the second single discrete media sample of the first media type is provided in a stream to the media player before the first single discrete media of the first media type. At 1825, the first single discrete media sample of the first media type and the second discrete media sample of the first media type are provided to a media player to be rendered at the streaming client. The streaming client receives data blocks for a stream comprising a plurality of data blocks from multiple sources.

Figure 19:
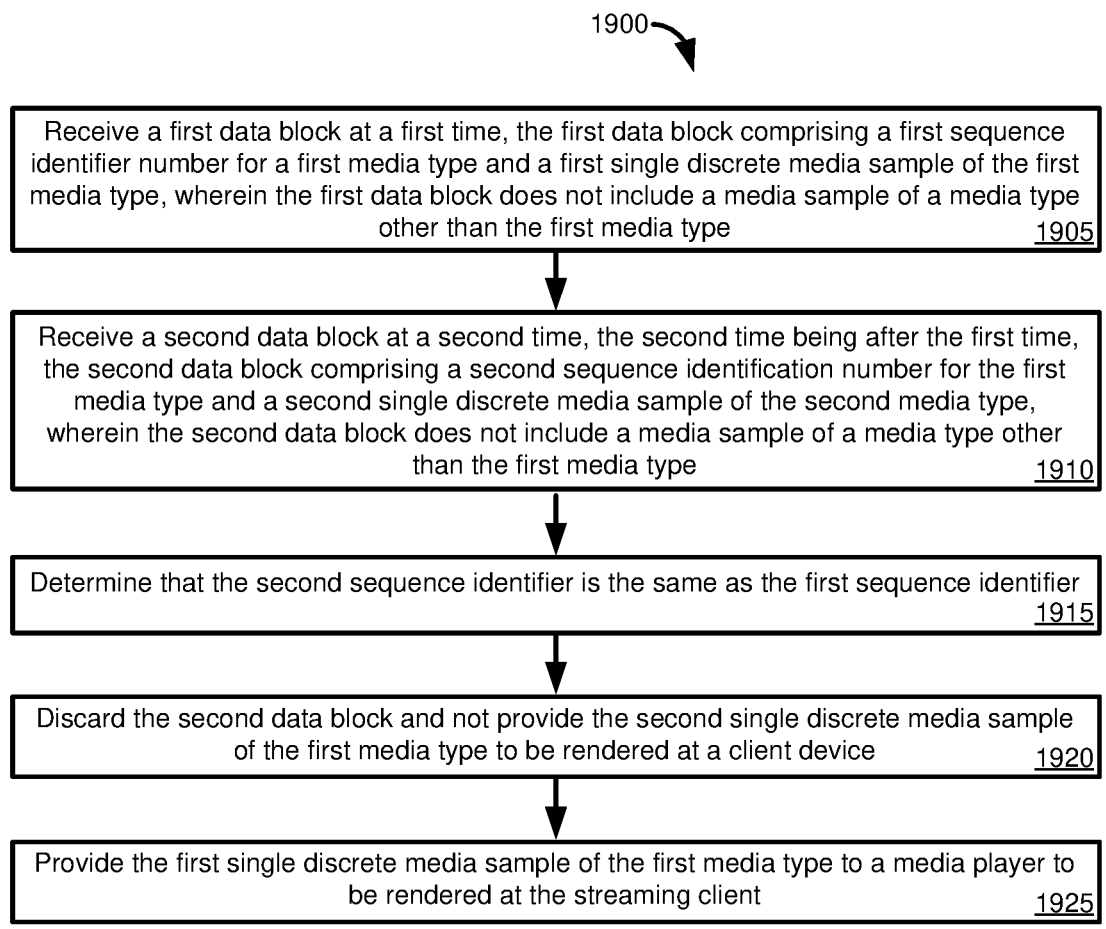
FIG. 19 is a flowchart of a process of performing processing operations at a streaming client with respect to blocks comprising media samples to facilitate low-latency media streaming by dropping duplicate blocks.

FIG. 19 is a flowchart of a process 1900 of performing processing operations at a streaming client with respect to blocks comprising media samples to facilitate low-latency media streaming. At 1905, a first data block is received at a first time. The first data block includes a first sequence identifier number for a first media type and a first single discrete media sample of the first media type. The first data block does not include a media sample of a media type other than the first media type.

A second data block is received at a second time at 1910. The second time is after the first time. The second data block includes a second sequence identification number for the first media type and a second single discrete media sample of the second media type. The second data block does not include a media sample of a media type other than the first media type. At 1915, it is determined that the second sequence identifier is the same as the first sequence identifier. The second data block, at 1920, is discarded and the second single discrete media sample of the first media type is not provided to be rendered at a client device. At 1925, the first single discrete media sample of the first media type is provided to a media player to be rendered at the streaming client. The streaming client receives data blocks for a stream comprising a plurality of data blocks from multiple sources.

Figure 20:
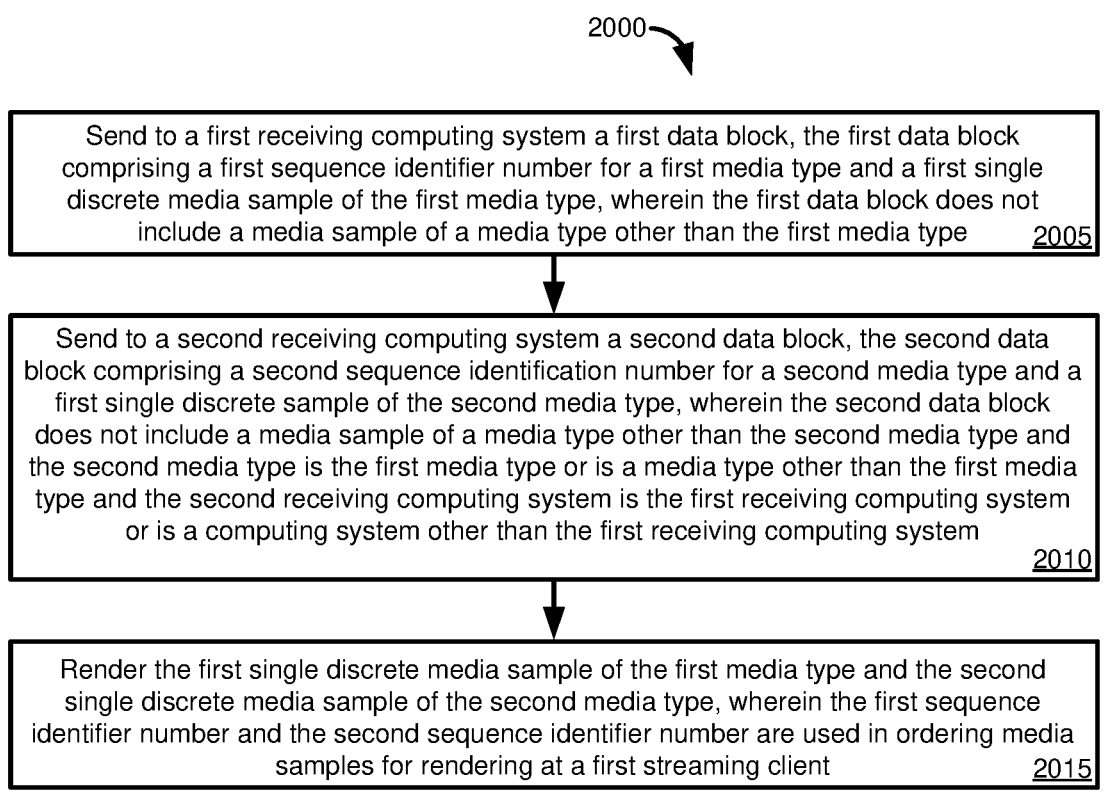
FIG. 20 is a flowchart of a process of performing operations as a streaming client in peer-to-peer delivery of streaming media content with low latency.

FIG. 20 is a flowchart of a process 2000 of performing operations as a streaming client in peer-to-peer delivery of streaming media content with low latency. At 2005, a first data block is sent to a first receiving computing system. The first data block includes a first sequence identifier number for a first media type and a first single discrete media sample of the first media type. The first data block does not include a media sample of a media type other than the first media type.

A second data block is sent to a second receiving computing system at 2010. The second data block includes a second sequence identification number for a second media type and a first single discrete sample of the second media type. The second data block does not include a media sample of a media type other than the second media type. The second media type is the first media type or is a media type other than the first media type. The second receiving computing system is the first receiving computing system or is a computing system other than the first receiving computing system.

At 2015, the first single discrete media sample of the first media type and the second single discrete media sample of the second media type are rendered. The first sequence identifier number and the second sequence identifier number are used in ordering media samples for rendering at a first streaming client. The streaming client receives data blocks for a stream comprising a plurality of data blocks from multiple sources.

Figure 21:
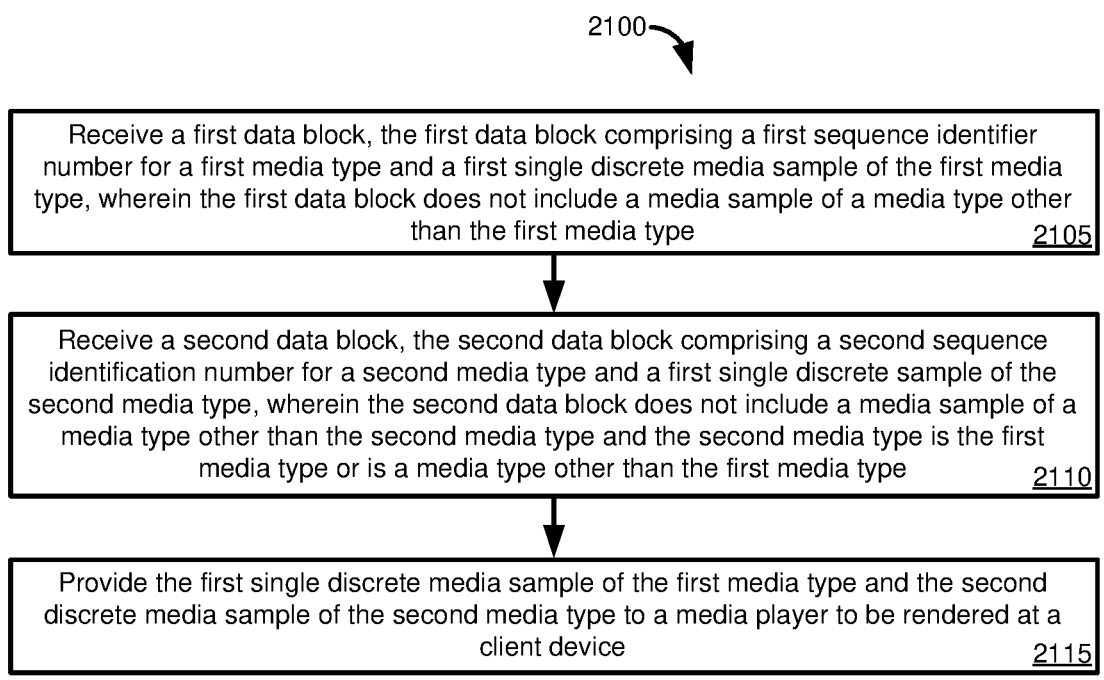
FIG. 21 is a flowchart of a process of performing processing operations in streaming media content with low latency using block sequence identification numbers.

FIG. 21 provides a flowchart of a process 2100 of performing processing operations in streaming media content with low latency. A first data block is received at 2105. The first data block includes a first sequence identifier number for a first media type and a first single discrete media sample of the first media type. The first data block does not include a media sample of a media type other than the first media type.

A second data block is received at 2110. The second data block includes a second sequence identification number for a second media type and a first single discrete sample of the second media type. The second data block does not include a media sample of a media type other than the second media type. The second media type is the first media type or is a media type other than the first media type. At 2115, the first single discrete media sample of the first media type and the second discrete media sample of the second media type are provided to a media player to be rendered at a client device. The client device receives data blocks for a stream comprising the first data block and the second data block from multiple sources.

Figure 22:
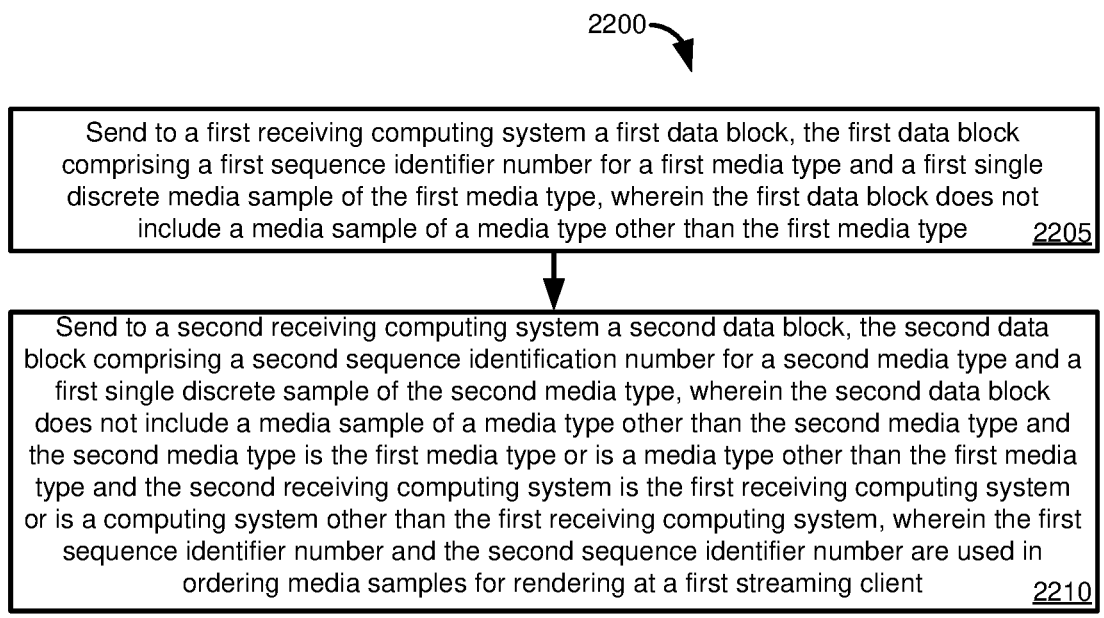
FIG. 22 is a flowchart of a process of operations in delivering streaming media content with low latency using block sequence identification numbers.

FIG. 22 provides a flowchart of a process 2200 of operations in delivering of streaming media content with low latency. A 2205, a first data block is sent to a first receiving computing system. The first data block includes a first sequence identifier number for a first media type and a first single discrete media sample of the first media type. The first data block does not include a media sample of a media type other than the first media type.

A second data block is sent to a second receiving computing system at 2210. The second data block includes a second sequence identification number for a second media type and a first single discrete sample of the second media type. The second data block does not include a media sample of a media type other than the second media type and the second media type is the first media type or is a media type other than the first media type. The second receiving computing system is the first receiving computing system or is a computing system other than the first receiving computing system. The first sequence identifier number and the second sequence identifier number are used in ordering media samples for rendering at a first streaming client. The first streaming client receives data blocks from a stream comprising the first data block and the second data block from multiple sources.

Example 16—Additional Examples

Example 1 is a computing system that includes at least one hardware processor and at least one memory coupled to the at least one hardware processor. The computing system further includes one or more computer-readable storage media storing computer-executable instructions that, when executed by the computing system, cause the computing system to perform processing operations at a streaming client with respect to blocks comprising media samples to facilitate low-latency media streaming.

The operations include receiving a first data block. The first data block includes a first sequence identifier number for a first media type and a first single discrete media sample of the first media type. The first data block does not include a media sample of a media type other than the first media type. A plurality of data blocks comprising respective single discrete media samples of the first media type are received. The single discrete media samples of the first media type are ordered in a stream.

A second data block is received. The second data block includes a second sequence identification number for a second media type and a first single discrete sample of the second media type. The second data block does not include a media sample of a media type other than the second media type and the second media type is a media type other than the first media type.

It is determined that a consecutive number of discrete media samples of the first media type satisfies a threshold.

Based on determining that a consecutive number of discrete media samples of the first media type satisfies a threshold, the first discrete sample of the second media type is inserted between consecutive media samples of the first media type in the stream. The first single discrete media sample of the first media type and the second discrete media sample of the second media type are provided to a media player to be rendered at the streaming client. The streaming client receives data blocks for a stream comprising the plurality of data blocks from multiple sources.

Example 2 includes the subject matter of Example 1. The first data block is received from a first source of the multiple sources and the second data block is received from a second source of the multiple sources. The second source is different than the first source.

Example 3 includes the subject matter of any of Examples 1 and 2. The first data block and the second data block are not received in response to specific requests for the first data block or the second data block.

Example 4 includes the subject matter of any of Examples 1-3. The first data block and the second data block do not include codec configuration information useable by the media player to render the first single discrete sample of the first media type or the first single discrete sample of the second media type.

Example 5 includes the subject matter of any of Examples 1-4. The first data block includes a first value for a block type identifier. The first value indicates that the first data block includes a sample of the first media type. The second data block includes a second value for the block type identifier. The second value indicates that the second data block includes a sample of the second media type. The second value is different than the first value.

Example 6 includes the subject matter of any of Examples 1-5. Example 6 further specifies that a third data block is received. The third data block includes a mapping of a GUID for an encryption key to an identifier of a local encryption key. The third data block does not include a media sample.

Example 7 includes the subject matter of any of Examples 1-6. The first data block includes a first timestamp for the first single discrete media sample of the first media type and the second data block includes a second timestamp for the first single discrete media sample of the second media type. Example 7 further specifies, during rendering at the client device, using the first timestamp and the second timestamp to synchronize rendering of the first single discrete media sample of the first media type and the first single discrete media sample of the second media type.

Example 8 includes the subject matter of any of Examples 1-7. The first single discrete media sample of the first media type is rendered at the streaming client without decoding the first single discrete media sample of the first media type.

Example 9 is a method that is implemented in a computing system that includes at least one hardware processor and at least one memory coupled to the at least one hardware processor. The method is used in performing processing operations at a streaming client with respect to blocks comprising media samples to facilitate low-latency media streaming. The method includes receiving a first data block at a first time. The first data block includes a first sequence identifier number for a first media type and a first single discrete media sample of the first media type. The first data block does not include a media sample of a media type other than the first media type.

A second data block is received at a second time. The second time is after the first time. The second data block includes a second sequence identification number for the first media type and a second single discrete sample of the first media type. The second data block does not include a media sample of a media type other than the first media type.

It is determined that the second sequence identifier is lower than the first sequence identifier. The first single discrete media sample of the first media type and the second single discrete media sample of the first media type are reordered so that the second single discrete media sample of the first media type is provided in a stream to the media player before the first single discrete media of the first media type. The first single discrete media sample of the first media type and the second discrete media sample of the first media type are provided to a media player to be rendered at the streaming client. The streaming client receives data blocks for a stream comprising a plurality of data blocks from multiple sources.

Example 10 includes the subject matter of Example 9. The determining that the second sequence number is lower than the first sequence number includes determining the first sequence number and the second sequence number are not consecutive. The method further includes, in response to the determining that the first single discrete media sample of the first media type and the second single discrete media sample of the first media type are not consecutive, providing the first single discrete media sample of the first media type and the second single discrete media sample of the first media type to be rendered by the client device with a gap between the first media sample of the first media type and the second media sample of the first media type.

Example 11 includes the subject matter of any of Examples 9 and 10. The determining that the second sequence number is lower than the first sequence number includes determining the first sequence number and the second sequence number are not consecutive. The method further includes, in response to the determining that the first single discrete media sample of the first media type and the second single discrete media sample of the first media type are not consecutive, generating a third single discrete media sample of the first media type to be placed in a gap between the first single discrete media sample of the first media type and the second single discrete media sample of the first media type.

Example 12 includes the subject matter of any of Examples 9-11. The first data block includes a first value for a block type identifier. The first value indicates that the first data block includes a sample of the first media type. The second data block includes the first value for the block type identifier.

Example 13 includes the subject matter of any of Examples 9-12. The first data block and the second data block are not received in response to specific requests for the first data block or the second data block.

Example 14 includes the subject matter of any of Examples 9-13. The first data block and the second data block do not include codec configuration information useable by the media player to render the first single discrete sample of the first media type or the second single discrete sample of the first media type.

Example 15 includes the subject matter of any of Examples 9-14. The first data block is received from a first source of the multiple sources and the second data block is received from a second source of the multiple sources. The second source is different than the first source.

Example 16 is one or more computer-readable storage media that include computer-executable instructions useable to perform processing operations at a streaming client with respect to blocks comprising media samples to facilitate low-latency media streaming. The one or more computer-readable storage media store computer-executable instructions that, when executed by a computing system including at least one hardware processor and at least one memory coupled to the at least one hardware processor, cause the computing system to perform various operations.

The operations include receiving a first data block at a first time. The first data block includes a first sequence identifier number for a first media type and a first single discrete media sample of the first media type. The first data block does not include a media sample of a media type other than the first media type.

A second data block is received at a second time. The second time is after the first time. The second data block includes a second sequence identification number for the first media type and a second single discrete media sample of the second media type. The second data block does not include a media sample of a media type other than the first media type.

It is determined that the second sequence identifier is the same as the first sequence identifier. The second data block is discarded, and the second single discrete media sample of the first media type is not provided to be rendered at the streaming client. The first single discrete media sample of the first media type is provided to a media player to be rendered at the streaming client. The streaming client receives data blocks for a stream comprising a plurality of data blocks from multiple sources.

Example 17 includes the subject matter of Example 16. The first data block includes a first value for a block type identifier. The first value indicates that the first data block includes a sample of the first media type. The second data block includes the first value for the block type identifier.

Example 18 includes the subject matter of Example 16 or Example 17. The first data block and the second data block are not received in response to specific requests for the first data block and the second data block.

Example 19 includes the subject matter of any of Examples 16-18. The first data block and the second data block do not include codec configuration information useable by the media player to render the first single discrete sample of the first media type or the second single discrete sample of the first media type.

Example 20 includes the subject matter of any of Examples 16-19. The first data block is received from a first source of the multiple sources and the second data block is received from a second source of the multiple sources. The second source is different than the first source.

Example 21 is a computing system that includes at least one hardware processor and at least one memory coupled to the at least one hardware processor. The computing system also includes one or more computer-readable storage media storing computer-executable instructions that, when executed by the computing system, cause the computing system to perform operations as a streaming client in peer-to-peer delivery of streaming media content with low latency.

The operations include sending to a first receiving computing system a first data block. The first data block includes a first sequence identifier number for a first media type and a first single discrete media sample of the first media type. The first data block does not include a media sample of a media type other than the first media type.

A second data block is sent to a second receiving computing system. The second data block includes a second sequence identification number for a second media type and a first single discrete sample of the second media type. The second data block does not include a media sample of a media type other than the second media type. The second media type is the first media type or is a media type other than the first media type. The second receiving computing system is the first receiving computing system or is a computing system other than the first receiving computing system. The first single discrete media sample of the first media type and the second single discrete media sample of the second media type are rendered. The first sequence identifier number and the second sequence identifier number are used in ordering media samples for rendering at a first streaming client. The streaming client receives data blocks for a stream comprising a plurality of data blocks from multiple sources.

Example 22 includes the subject matter of Example 21. The first receiving computing system is a second streaming client. The second streaming client is the first streaming client or is a streaming client other than the first streaming client.

Example 23 includes the subject matter of Example 21 or Example 22. Example 23 further specifies that the first data block is sent to at least another receiving computing system.

Example 24 includes the subject matter of any of Examples 21-23. The second media type is a media type other than the first media type.

Example 25 includes the subject matter of any of Examples 21-23. The second media type is the first media type.

Example 26 includes the subject matter of any of Example 21-25. The first data block includes a first timestamp for the first single discrete media sample of the first media type and the second data block includes a second timestamp for the first discrete media sample of the second media type. The first timestamp and the second timestamp are useable for synchronizing rendering of media samples of different media types.

Example 27 includes the subject matter of any of Examples 21-26. The computing system receives the first data block from a provider computing system.

Example 28 includes the subject matter of Example 27. The provider computing system is also a streaming client.

Example 29 includes the subject matter of any of Examples 21-28. The second receiving computing system is the first receiving computing system.

Example 30 includes the subject matter of any of Examples 21-28. The second receiving computing system is a computing system other than the first receiving computing system.

Example 31 includes the subject matter of any of Examples 21-30. The first single discrete media sample of the first media type is a keyframe, and the sending is performed after determining that the first single discrete media sample of the first media type is a keyframe.

Example 32 includes the subject matter of any of Examples 21-31. The first single discrete media sample of the first media type is renderable at the first streaming client without decoding the first single discrete media sample of the first media type.

Example 33 includes the subject matter of any of Examples 21-32. The first data block and the second data block are not sent in response to specific requests for the first data block and the second data block.

Example 34 includes the subject matter of any of Examples 21-33. The first data block and the second data block do not include codec configuration information useable by a media player of the first streaming client to render the first single discrete sample of the first media type or the first single discrete sample of the second media type.

Example 35 includes the subject matter of any of Examples 21-24 or 26-34. The first data block includes a first value for a block type identifier, the first value indicating that the first data block includes a sample of the first media type. The second data block includes a second value for the block type identifier. The second value indicates that the second data block includes a sample of the second media type. The second media type is different than the first media type. The second value is different than the first value.

Example 36 includes the subject matter of any of Examples 21-23 or 25-34. The second media type is the first media type and the first data block includes a first value for a block type identifier. The first value indicates that the first data block includes a sample of the first media type. The second data block includes the first value for the block type identifier.

Example 37 includes the subject matter of any of Examples 21-36. Example 37 further specifies sending a third data block to the first receiving computing system. The third data block includes a mapping of GUID for an encryption key to an identifier of a local encryption key. The third data block does not include a media sample.

Example 38 is a method that is implemented in a computing system that includes at least one hardware processor and at least one memory coupled to the at least one hardware processor. The method is used in performing processing operations in streaming media content with low latency. The method includes receiving a first data block. The first data block includes a first sequence identifier number for a first media type and a first single discrete media sample of the first media type. The first data block does not include a media sample of a media type other than the first media type.

A second data block is received. The second data block includes a second sequence identification number for a second media type and a first single discrete sample of the second media type. The second data block does not include a media sample of a media type other than the second media type. The second media type is the first media type or is a media type other than the first media type. The first single discrete media sample of the first media type and the second discrete media sample of the second media type are provided to a media player to be rendered at a client device. The client device receives data blocks for a stream comprising the first data block and the second data block from multiple sources.

Example 39 includes the subject matter of Example 38. The second media type is different than the first media type. Example 39 further specifies that the method includes determining that a consecutive number of discrete media samples of the first media type satisfies a threshold. Based on determining that a consecutive number of discrete media samples of the first media type satisfies a threshold, the first discrete sample of the second media type is inserted between consecutive media samples of the first media type in the stream. The first single discrete media sample of the first media type and the second discrete media sample of the second media type are provided to a media player to be rendered at the streaming client.

Example 40 is one or more computer-readable storage media that include computer-executable instructions useable to perform processing operations in delivery of streaming media content with low latency. The one or more computer-readable storage media include computer-executable instructions that, when executed by a computing system that includes at least one hardware processor and at least one memory coupled to the at least one hardware processor, cause the computing system to perform various operations.

The operations include sending a first data block to a first receiving computing system. The first data block includes a first sequence identifier number for a first media type and a first single discrete media sample of the first media type. The first data block does not include a media sample of a media type other than the first media type. A second data block is sent to a second receiving computing system. The second data block includes a second sequence identification number for a second media type and a first single discrete sample of the second media type. The second data block does not include a media sample of a media type other than the second media type. The second media type is the first media type or is a media type other than the first media type. The second receiving computing system is the first receiving computing system or is a computing system other than the first receiving computing system. The first sequence identifier number and the second sequence identifier number are used in ordering media samples for rendering at a first streaming client. The first streaming client receives data blocks from a stream comprising the first data block and the second data block from multiple sources.

Example 17—Example Computing Systems

Figure 23:
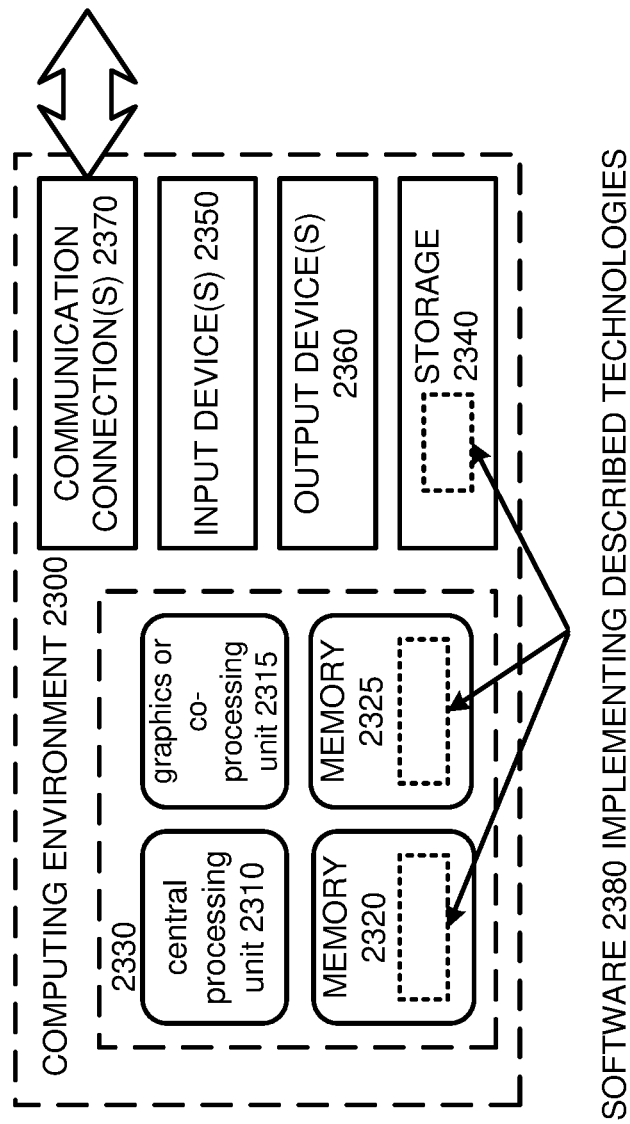
FIG. 23 is a diagram of an example computing system in which some described embodiments can be implemented.

FIG. 23 depicts a generalized example of a suitable computing system 2300 in which the described technologies may be implemented. The computing system 2300 is not intended to suggest any limitation as to scope of use or functionality, as the technologies may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions. A processing unit can be a general-purpose central processing unit (CPU), processor in an application-specific integrated circuit (ASIC), or any other type of processor. A processing unit can also include multiple processors. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s). The memory 2320, 2325 stores software 2380 implementing one or more technologies described herein, in the form of computer-executable instructions suitable for execution by the processing unit(s).

A computing system may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information and which can be accessed within the computing system 2300. The storage 2340 stores instructions for the software 2380 implementing one or more technologies described herein.

The input device(s) 2350 may be a touch input device such as a keyboard, mouse, pen, or trackball, a voice input device, a scanning device, or another device that provides input to the computing system 2300. For video encoding, the input device(s) 2350 may be a camera, video card, TV tuner card, or similar device that accepts video input in analog or digital form, or a CD-ROM or CD-RW that reads video samples into the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Example Cloud-Supported Environment

Figure 24:
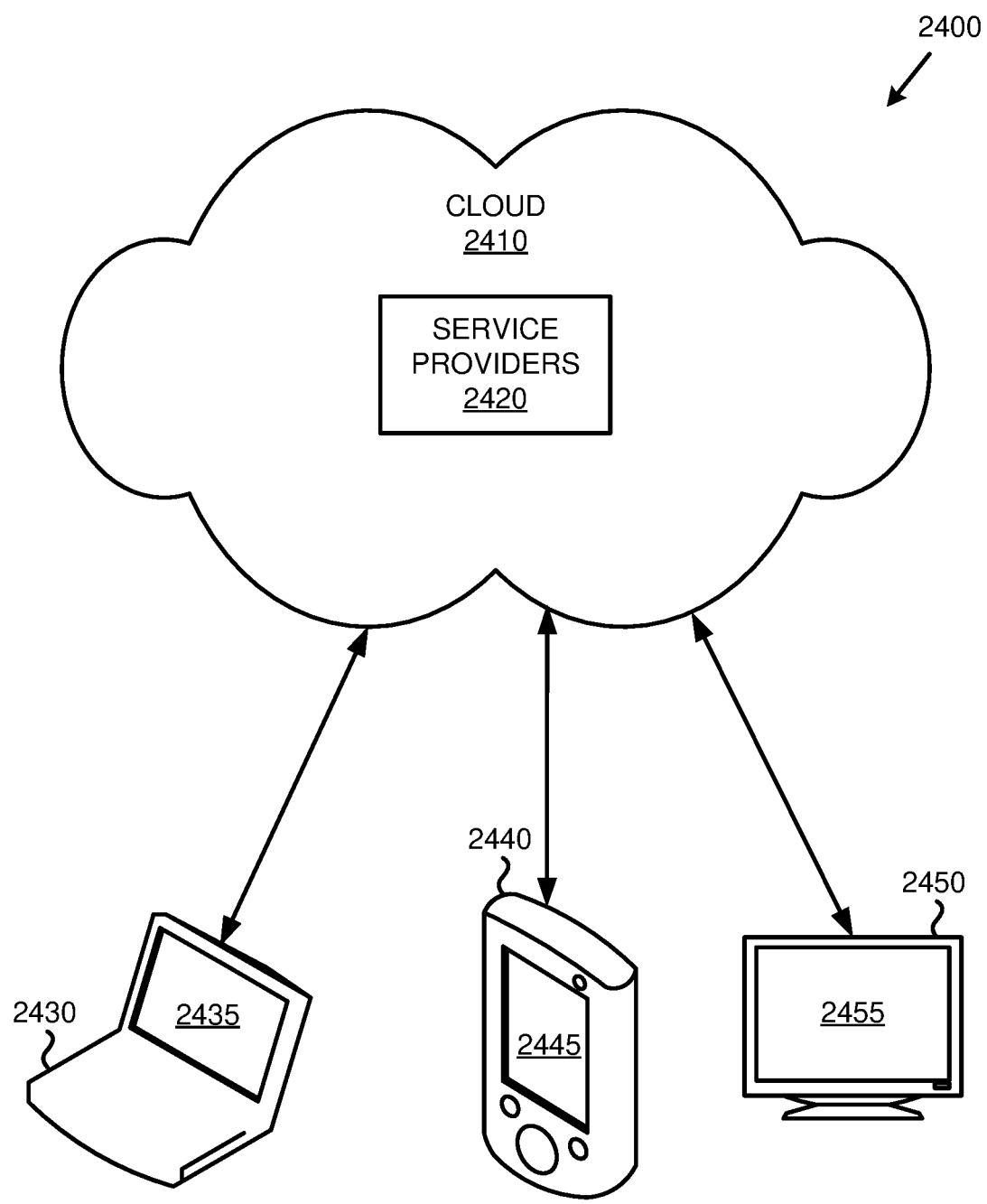
FIG. 24 is an example cloud-support environment that can be used in conjunction with the technologies described herein.

FIG. 24 illustrates a generalized example of a suitable cloud-supported environment 2400 in which described embodiments, techniques, and technologies may be implemented. In the example environment 2400, various types of services (e.g., computing services) are provided by a cloud 2410. For example, the cloud 2410 can include a collection of computing devices, which may be located centrally or distributed, that provide cloud-based services to various types of users and devices connected via a network such as the Internet. The implementation environment 2400 can be used in different ways to accomplish computing tasks. For example, some tasks (e.g., processing user input and presenting a user interface) can be performed on local computing devices (e.g., connected devices 2430, 2440, 2450) while other tasks (e.g., storage of data to be used in subsequent processing) can be performed in the cloud 2410.

In example environment 2400, the cloud 2410 provides services for connected devices 2430, 2440, 2450 with a variety of screen capabilities. Connected device 2430 represents a device with a computer screen 2435 (e.g., a mid-size screen). For example, connected device 2430 could be a personal computer such as desktop computer, laptop, notebook, netbook, or the like. Connected device 2440 represents a device with a mobile device screen 2445 (e.g., a small size screen). For example, connected device 2440 could be a mobile phone, smart phone, personal digital assistant, tablet computer, and the like. Connected device 2450 represents a device with a large screen 2455. For example, connected device 2450 could be a television screen (e.g., a smart television) or another device connected to a television (e.g., a set-top box or gaming console) or the like. One or more of the connected devices 2430, 2440, 2450 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2400. For example, the cloud 2410 can provide services for one or more computers (e.g., server computers) without displays.

Services can be provided by the cloud 2410 through service providers 2420, or through other providers of online services (not depicted). For example, cloud services can be customized to the screen size, display capability, and/or touchscreen capability of a particular connected device (e.g., connected devices 2430, 2440, 2450).

In example environment 2400, the cloud 2410 provides the technologies and solutions described herein to the various connected devices 2430, 2440, 2450 using, at least in part, the service providers 2420. For example, the service providers 2420 can provide a centralized solution for various cloud-based services. The service providers 2420 can manage service subscriptions for users and/or devices (e.g., for the connected devices 2430, 2440, 2450 and/or their respective users).

Example 19—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 23, computer-readable storage media include memory 2320 and 2325, and storage 2340. The term computer-readable storage media does not include signals and carrier waves. In addition, the term computer-readable storage media does not include communication connections, such as 2370.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing system comprising:
at least one hardware processor;
at least one memory coupled to the at least one hardware processor; and
one or more computer-readable storage media storing computer-executable instructions that, when executed by the computing system, cause the computing system to perform operations as a streaming client in peer-to-peer delivery of streaming media content with low latency, the operations comprising:
sending to a first receiving computing system a first data block, the first data block comprising a first sequence identifier number for a first media type and a first single discrete media sample of the first media type, wherein the first data block does not comprise a media sample of a media type other than the first media type and does not comprise additional samples of the first media type;
sending to a second receiving computing system a second data block, the second data block comprising a second sequence identification number for a second media type and a first single discrete sample of the second media type, wherein the second data block does not comprise a media sample of a media type other than the second media type and does not comprise additional samples of the second media type, and the second media type is the first media type or is a media type other than the first media type and the second receiving computing system is the first receiving computing system or is a computing system other than the first receiving computing system; and
rendering the first single discrete media sample of the first media type and the second single discrete media sample of the second media type as part of a single rendering stream, wherein data blocks of different media types are arranged, during the rendering or prior to the rendering, into a sequence based on their respective sequence identifier numbers such that media samples of different types are interspersed within the single rendering stream in a manner that defines a rendering timeline;
wherein the first sequence identifier number and the second sequence identifier number are used in ordering media samples for rendering at a first streaming client and the first streaming client receives data blocks for the single rendering stream from multiple sources.

2. The computing system of claim 1, wherein the computing system receives the first data block from a provider computing system.

3. The computing system of claim 2, wherein the provider computing system is also a streaming client.

4. The computing system of claim 1, wherein the first receiving computing system is a second streaming client, the second streaming client being the first streaming client or being a streaming client other than the first streaming client.

5. The computing system of claim 1, the operations further comprising:
sending the first data block to at least another receiving computing system.

6. The computing system of claim 1, where the second media type is a media type other than the first media type.

7. The computing system of claim 1, wherein the second media type is the first media type.

8. The computing system of claim 1, wherein the first data block comprises a first timestamp for the first single discrete media sample of the first media type and the second data block comprises a second timestamp for the first discrete media sample of the second media type, wherein the first timestamp and the second timestamp are useable for synchronizing rendering of media samples of different media types.

9. The computing system of claim 1, wherein the second receiving computing system is the first receiving computing system.

10. The computing system of claim 1, wherein the second receiving computing system is a computing system other than the first receiving computing system.

11. The computing system of claim 1, wherein the first single discrete media sample of the first media type is a keyframe, and the sending is performed after determining that the first single discrete media sample of the first media type is a keyframe.

12. The computing system of claim 1, wherein the first single discrete media sample of the first media type is renderable at the first streaming client without decoding the first single discrete media sample of the first media type.

13. The computing system of claim 1, wherein the first data block and the second data block are not sent in response to specific requests for the first data block and the second data block.

14. The computing system of claim 1, wherein the first data block and the second data block do not comprise codec configuration information useable by a media player of the first streaming client to render the first single discrete sample of the first media type or the first single discrete sample of the second media type.

15. The computing system of claim 1, wherein the first data block comprises a first value for a block type identifier, the first value indicating that the first data block comprises a sample of the first media type, and the second data block comprises a second value for the block type identifier, the second value indicating that the second data block comprises a sample of the second media type, wherein the second media type is different than the first media type and the second value is different than the first value.

16. The computing system of claim 1, wherein the second media type is the first media type and the first data block comprises a first value for a block type identifier, the first value indicating that the first data block comprises a sample of the first media type, and the second data block comprises the first value for the block type identifier.

17. The computing system of claim 1, the operations further comprising:
sending a third data block to the first receiving computing system, the third data block comprising a mapping of GUID for an encryption key to an identifier of a local encryption key, wherein the third data block does not comprise a media sample.

18. A method, implemented in a computing system comprising at least one hardware processor and at least one memory coupled to the at least one hardware processor, used in performing processing operations in streaming media content with low latency, the method comprising:
receiving a first data block, the first data block comprising a first sequence identifier number for a first media type and a first single discrete media sample of the first media type, wherein the first data block does not comprise a media sample of a media type other than the first media type and does not comprise additional samples of the first media type;
receiving a second data block, the second data block comprising a second sequence identification number for a second media type and a first single discrete sample of the second media type, wherein the second data block does not comprise a media sample of a media type other than the second media type and does not comprise additional samples of the second media type, and the second media type is the first media type or is a media type other than the first media type; and
providing the first single discrete media sample of the first media type and the second discrete media sample of the second media type to a media player to be rendered at a client device as part of a single rendering stream, wherein data blocks of different media types are arranged, during the rendering or prior to the rendering, into a sequence based on their respective sequence identifier numbers such that media samples of different types are interspersed in a manner that defines a rendering timeline, and wherein the client device receives data blocks for the single rendering stream from multiple sources.

19. The method of claim 18, wherein the second media type is different than the first media type, the method further comprising:
determining that a consecutive number of discrete media samples of the first media type satisfies a threshold;
based on determining that a consecutive number of discrete media samples of the first media type satisfies a threshold, inserting the first discrete sample of the second media type between consecutive media samples of the first media type in the stream; and
providing the first single discrete media sample of the first media type and the second discrete media sample of the second media type to a media player to be rendered at the streaming client.

20. One or more computer-readable storage media comprising computer-executable instructions useable to perform processing operations in delivery of streaming media content with low latency, the one or more computer-readable storage media comprising:
computer-executable instructions that, when executed by a computing system comprising at least one hardware processor and at least one memory coupled to the at least one hardware processor, cause the computing system to send to a first receiving computing system a first data block, the first data block comprising a first sequence identifier number for a first media type and a first single discrete media sample of the first media type, wherein the first data block does not comprise a media sample of a media type other than the first media type and does not comprise additional samples of the first media type; and
computer-executable instructions that, when executed by the computing system, cause the computing system to send to a second receiving computing system a second data block, the second data block comprising a second sequence identification number for a second media type and a first single discrete sample of the second media type, wherein the second data block does not comprise a media sample of a media type other than the second media type and does not comprise additional samples of the second media type, and the second media type is the first media type or is a media type other than the first media type and the second receiving computing system is the first receiving computing system or is a computing system other than the first receiving computing system;
wherein the first sequence identifier number and the second sequence identifier number are used in ordering media samples for rendering at a first streaming client and the first streaming client receives data blocks from a single rendering stream comprising the first data block and the second data block from multiple sources, the data blocks being arranged, during rendering or prior to rendering, into a sequence in which media samples of different types are interspersed in a manner that defines a rendering timeline.

\* \* \* \* \*